United States Patent
Yoshida et al.

(10) Patent No.: US 10,738,169 B2
(45) Date of Patent: Aug. 11, 2020

(54) RESIN COMPOSITION

(71) Applicant: KAO CORPORATION, Tokyo (JP)

(72) Inventors: Yutaka Yoshida, Wakayama (JP);
Shotaro Shibata, Wakayama (JP);
Yoshiaki Kumamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 137 days.

(21) Appl. No.: 15/757,748

(22) PCT Filed: Sep. 5, 2016

(86) PCT No.: PCT/JP2016/076055
§ 371 (c)(1),
(2) Date: Mar. 6, 2018

(87) PCT Pub. No.: WO2017/043452
PCT Pub. Date: Mar. 16, 2017

(65) Prior Publication Data
US 2019/0023859 A1    Jan. 24, 2019

(30) Foreign Application Priority Data
Sep. 7, 2015    (JP) .................................. 2015-176047

(51) Int. Cl.
| | | |
|---|---|---|
| *C08J 5/04* | (2006.01) | |
| *C08L 1/28* | (2006.01) | |
| *C08L 101/06* | (2006.01) | |
| *C08L 101/00* | (2006.01) | |
| *C08L 61/04* | (2006.01) | |
| *C08B 11/193* | (2006.01) | |
| *C08B 11/08* | (2006.01) | |
| *C08L 79/08* | (2006.01) | |
| *C08L 63/00* | (2006.01) | |

(52) U.S. Cl.
CPC .............. *C08J 5/046* (2013.01); *C08B 11/08* (2013.01); *C08B 11/193* (2013.01); *C08J 5/04* (2013.01); *C08L 1/28* (2013.01); *C08L 1/284* (2013.01); *C08L 61/04* (2013.01); *C08L 63/00* (2013.01); *C08L 79/08* (2013.01); *C08L 101/00* (2013.01); *C08L 101/06* (2013.01); *C08J 2300/104* (2013.01); *C08J 2300/22* (2013.01); *C08J 2301/28* (2013.01)

(58) Field of Classification Search
CPC .. C08J 5/046; C08J 2300/104; C08J 2301/28; C08J 2300/22; C08L 1/28; C08L 101/06
See application file for complete search history.

(56) References Cited

U.S. PATENT DOCUMENTS

| | | |
|---|---|---|
| 6,703,497 B1 | 3/2004 | Ladouce et al. |
| 2001/0018468 A1 | 8/2001 | Karlson |
| 2007/0059267 A1 | 3/2007 | Boström et al. |
| 2007/0105985 A1 | 5/2007 | Gillette et al. |
| 2012/0328877 A1 | 12/2012 | Shiramizu et al. |

FOREIGN PATENT DOCUMENTS

| | | |
|---|---|---|
| FR | 2800378 A1 | 5/2001 |
| JP | 2000-143701 A | 5/2000 |
| JP | 2002-522569 A | 7/2002 |
| JP | 2002-524618 A | 8/2002 |
| JP | 2009-19200 A | 1/2009 |
| JP | 2009-144262 A | 7/2009 |
| JP | 2009-197122 A | 9/2009 |
| JP | 2011-184816 A | 9/2011 |
| JP | 2012-237002 A | 12/2012 |
| JP | 2014-193959 A | 10/2014 |
| JP | 2014-218598 A * | 11/2014 |

(Continued)

OTHER PUBLICATIONS

Extended European Search Report for European Application No. 16844313.3, dated Mar. 29, 2019.
International Search Report (Form PCT/ISA/210) for Application No. PCT/JP2016/076055, dated Nov. 1, 2016.
"Polymer Material Molding Process", May 31, 2000, 7 pages total.
Chinese Office Action and Search Report dated Sep. 2, 2019, for Chinese Application No. 201680051510.9.

* cited by examiner (Continued)

*Primary Examiner* — Robert D Harlan
(74) *Attorney, Agent, or Firm* — Birch, Stewart, Kolasch & Birch, LLP

(57) ABSTRACT

A resin composition containing: (A) one or more resins selected from the group consisting of a thermoplastic resin, and a curable resin selected from an epoxy resin, a (meth) acrylic resin, a phenolic resin, an unsaturated polyester resin, a polyurethane resin, or a polyimide resin; and (B) modified cellulose fibers wherein one or more substituents selected from substituents represented by the following general formulas (1) and (2): —$CH_2$—$CH(OH)$—$R_1$ (1), —$CH_2$—$CH(OH)$—$CH_2$—$(OA)_n$—O—$R_1$ (2), wherein each $R_1$ in the general formulas (1) and (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms are bonded to cellulose fibers via an ether bond, wherein the modified cellulose fibers have a cellulose I crystal structure. The resin composition of the present invention can be suitably used in various applications such as daily sundries, household electric appliance parts, wrapping materials for household electric appliance parts, automobile parts, and resins for three-dimensional modeling.

18 Claims, No Drawings

(56) References Cited

FOREIGN PATENT DOCUMENTS

| JP | 2014-218598 A | 11/2014 |
|----|---------------|---------|
| JP | 2017-53077 A | 3/2017 |
| JP | 2017-71676 A | 4/2017 |

RESIN COMPOSITION

FIELD OF THE INVENTION

The present invention relates to a resin composition. More specifically, the present invention relates to a resin composition which can be suitably used in daily sundries, household electric appliance parts, automobile parts, resins for three-dimensional modeling, and the like, and a method for producing the resin composition.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in large amounts in nature have been remarked.

For example, Patent Publication 1 discloses cellulose nanofibers having an average degree of polymerization of 600 or more and 30,000 or less, an aspect ratio of from 20 to 10,000, and an average diameter of from 1 to 800 nm as cellulose nanofibers having excellent reinforcing effects, characterized in that the cellulose nanofibers have crystal peaks of Iβ form in X-ray diffraction patterns. The resin composition containing the cellulose nanofibers shows excellent moldability and a coefficient of linear thermal expansion.

Patent Publication 2 discloses that pulps containing a lignin are subjected to a mechanical defibration treatment to provide microfibrillated vegetable fibers with a structure coated with hemicellulose and lignin in that order, thereby making them easier to handle in an aqueous system, and that the fiber-reinforced resin blended with the vegetable fibers has a decomposition temperature higher than a conventional microfibrillated cellulose, so that they are excellent in thermal stability.

Patent Publication 3 discloses cellulose microfibrils having a modified surface, characterized in that a hydroxyl functional group existing on a surface of the microfibrils is etherified with at least one of an organic compound capable of reacting with the hydroxyl functional group, wherein the degree of substitution of surface (DSS) during etherification is at least 0.05. The publication describes that an elastomeric composition containing the microfibrils shows excellent mechanical strength.

Patent Publication 4 discloses a composite material containing cellulose microfibers of which surface is replaced with an ether group having a degree of substitution of surface (DSS) of at least 0.05.

Patent Publication 1: Japanese Patent Laid-Open No. 2011-184816

Patent Publication 2: Japanese Patent Laid-Open No. 2009-19200

Patent Publication 3: Japanese Unexamined Patent Publication No. 2002-524618

Patent Publication 4: FR2800378 Publication

SUMMARY OF THE INVENTION

The present invention relates to the following [1] to [2]:

[1] A resin composition containing:
(A) one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin; and
(B) modified cellulose fibers wherein one or more substituents selected from substituents represented by the following general formula (1) and substituents represented by the following general formula (2)

$$-CH_2-CH(OH)-R_1 \qquad (1)$$

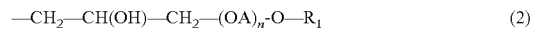

$$-CH_2-CH(OH)-CH_2-(OA)_n-O-R_1 \qquad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms
are bonded to cellulose fibers via an ether bond, wherein the modified cellulose fibers have a cellulose I crystal structure.

[2] A method for producing a resin composition containing:
(A) one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin; and
(B) modified cellulose fibers, including:
introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, and
mixing the modified cellulose fibers obtained and the above resin to provide modified cellulose fibers.

DETAILED DESCRIPTION OF THE INVENTION

In the compositions containing cellulose fibers of Patent Publications 1 to 4, it is still not said to be sufficient in the improvements in mechanical strength, heat resistance, and dimensional stability.

The present invention relates to a resin composition containing a filler capable of improving mechanical strength, heat resistance, and dimensional stability when blended with a thermoplastic resin or a curable resin, and a method for producing the resin composition.

The resin composition of the present invention exhibits some excellent effects that the resin composition has excellent heat resistance, mechanical strength, and dimensional stability.

[Resin Composition]

The resin composition of the present invention is characterized in that the resin composition contains a specified resin and specified modified cellulose fibers.

[(B) Modified Cellulose Fibers]

The modified cellulose fibers in the present invention are characterized in that a specified substituent is bonded to a cellulose fiber surface via an ether bond. The above modified cellulose fibers may be hereinafter described as the modified cellulose fibers of the present invention. The phrase "bonded via an ether bond" as used herein means a state in which a hydroxyl group of the cellulose fiber surface is reacted with a modifying group to form an ether bond.

The reasons why the resin composition having excellent heat resistance, mechanical strength, and dimensional stability is obtained when the modified cellulose fibers of the present invention are blended with a resin described later are assumed to be as follows. Celluloses, in general, are aggregated by hydrogen bonding with the surface hydroxyl groups to form bundles of microfibrils, meanwhile in the modified cellulose fibers used in the present invention, the modifying group is directly ether bonded to the cellulose chain of the cellulose fiber backbone by carrying out a reaction of introducing a specified modifying group to a surface hydroxyl group, thereby forming hydrophobic cellulose fibers in which the crystal structures of the cellulose are maintained. In addition, since the introduced modifying group has an alkyl group terminal of a specified chain length, a repulsion due to steric hindrance is obtained, thereby making dispersibility in a resin excellent. Therefore, the modified cellulose fibers used in the present invention are evenly dispersed in a resin, and their crystal structures are stably maintained, so that the mechanical strength, heat resistance, and dimensional stability of the resin composition obtained become excellent. However, these assumptions are by no means limiting the present invention.

(Average Fiber Size)

The modified cellulose fibers of the present invention have an average fiber size of preferably 5 μm or more, more preferably 7 μm or more, and even more preferably 10 μm or more, from the viewpoint of improvements in mechanical strength, handling property, availability, and costs. In addition, the upper limit is, but not particularly set to, preferably 100 μm or less, more preferably 70 μm or less, even more preferably 50 μm or less, even more preferably 40 μm or less, and even more preferably 30 μm or less, from the viewpoint of handling property and improvement in mechanical strength. Here, the average fiber size of the cellulose fibers as used herein can be measured in accordance with the following method.

Specific examples include, for example, a method including stirring cellulose fibers which are previously absolutely dried with a household mixer or the like in ion-exchanged water to defibrillate, and further adding ion-exchange water thereto while stirring to make an even aqueous dispersion, and analyzing a part of the aqueous dispersion obtained by "Kajaani Fiber Lab" manufactured by Metso Automation. According to the above method, the average fiber size can be measured in the order of micro-order. Incidentally, the detailed measurement method is as described in Examples.

In addition, the modified cellulose fibers of the present invention may have a fine average fiber size. For example, the cellulose fibers can be finely fibrillated by carrying out a treatment with a high-pressure homogenizer or the like in an organic solvent. The average fiber size of the finely fibrillated modified cellulose fibers may be, for example, from 1 to 500 nm or so, and the average fiber size is preferably 3 nm or more, more preferably 10 nm or more, and even more preferably 20 nm or more, from the viewpoint of improvement in heat resistance, and the average fiber size is preferably 300 nm or less, more preferably 200 nm or less, even more preferably 150 nm or less, and still even more preferably 120 nm or less, from the viewpoint of handling property and dimensional stability. Here, the finely fibrillated modified cellulose fibers as used herein may be hereinafter described as fine modified cellulose fibers.

In a case of having a fine average fiber size as mentioned above, a fiber size of a nano-order can be measured by observing a dispersion obtained by a finely fibrillating treatment with an optical microscope manufactured by KEYENCE, "Digital Microscope VHX-1000" at a magnification of from 300 to 1,000 folds, and calculating an average of 30 or more of fiber strands. In a case where observation with an optical microscope is difficult, a dispersion prepared by further adding a solvent to the above dispersion is dropped on mica and dried to provide an observation sample, and a measurement can be taken with an interatomic force microscope (AFM), Nanoscope III Tapping mode AFM, manufactured by Digital Instrument, using probe Point Probe (NCH) manufactured by NANOSENSORS. Generally, a minimum unit of cellulose nanofibers prepared from higher plants is packed in nearly square form having sizes of 6×6 molecular chains, so that the height analyzed in the image according to the AFM can be assumed to be a width of the fibers. Here, the detailed method for measurement is as described in Examples.

(Modifying Group)

The modifying group in the modified cellulose fibers of the present invention is a substituent represented by the following general formula (1) and a substituent represented by the following general formula (2):

$$-CH_2-CH(OH)-R_1 \qquad (1)$$

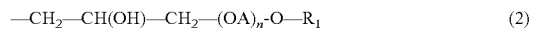

$$-CH_2-CH(OH)-CH_2-(OA)_n-O-R_1 \qquad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and these substituents are introduced alone or in any combinations thereof. Here, even if the introduced modifying group were either one of the above of substituents, each of substituents, which may be the identical substituent, or a combination of two or more kinds, may be introduced.

$R_1$ in the general formula (1) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, and even more preferably 10 or more, from the viewpoint of mechanical strength, dimensional stability, and heat resistance, and the number of carbon atoms is preferably 25 or less, more preferably 20 or less, even more preferably 18 or less, even more preferably 16 or less, even more preferably 12 or less, and still even more preferably 10 or less, from the viewpoint of dimensional stability, heat resistance, and improvement in reactivity. Specific examples include a propyl group, a butyl group, a pentyl group, a hexyl group, a heptyl group, an octyl group, a nonyl group, a decyl group, an undecyl group, a dodecyl group, a hexadecyl group, an octadecyl group, an icosyl group, a triacontyl group, and the like.

$R_1$ in the general formula (2) is a linear or branched alkyl group having 3 or more carbon atoms and 30 or less carbon atoms. The number of carbon atoms of the alkyl group is 3 or more and 30 or less, and the number of carbon atoms is preferably 4 or more, and more preferably 6 or more, from the viewpoint of mechanical strength, dimensional stability, and heat resistance, and the number of carbon atoms is preferably 27 or less, more preferably 22 or less, even more preferably 20 or less, even more preferably 18 or less, even more preferably 16 or less, and even more preferably 12 or less, from the viewpoint of availability and improvement in reactivity. Specific examples include the same ones as those of $R_1$ in the general formula (1).

A in the general formula (2) is a linear or branched, divalent saturated hydrocarbon group having 1 or more carbon atoms and 6 or less carbon atoms, which forms an oxyalkylene group with an adjoining oxygen atom. The number of carbon atoms of A is 1 or more and 6 or less, and the number of carbon atoms is preferably 2 or more, from the viewpoint of availability and costs, and the number of carbon atoms is preferably 4 or less, and more preferably 3 or less, from the same viewpoint. Specific examples include a methylene group, an ethylene group, a propylene group, a butylene group, a pentylene group, a hexylene group, and the like, among which an ethylene group and a propylene group are preferred, and an ethylene group is more preferred.

n in the general formula (2) shows the number of moles of alkylene oxides added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint.

The combination of A and n in the general formula (2) is preferably a combination in which A is a linear or branched, divalent saturated hydrocarbon group having 2 or more carbon atoms and 3 or less carbon atoms and n is a number of 0 or more and 20 or less, and more preferably a combination in which A is a linear or branched, divalent saturated hydrocarbon group having 2 or more carbon atoms and 3 or less carbon atoms and n is a number of 5 or more and 15 or less, from the viewpoint of reactivity and thickening effects due to exhibition of steric repulsion.

Specific examples of the substituent represented by the general formula (1) include, for example, a propylhydroxyethyl group, a butylhydroxyethyl group, a pentylhydroxyethyl group, a hexylhydroxyethyl group, a heptylhydroxyethyl group, an octylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an icosylhydroxyethyl group, a triacontylhydroxyethyl group, and the like.

Specific examples of the substituent represented by the general formula (2) include, for example, a 3-butoxy-2-hydroxy-propyl group, a 3-hexoxyethylene oxide-2-hydroxy-propyl group, a 3-hexoxy-2-hydroxy-propyl group, a 3-octoxyethylene oxide-2-hydroxy-propyl group, a 3-octoxy-2-hydroxy-propyl group, a 6-ethyl-3-hexoxy-2-hydroxy-propyl group, a 6-ethyl-3-hexoxyethylene oxide-2-hydroxy-propyl group, a 3-decoxyethylene oxide-2-hydroxy-propyl group, a 3-decoxy-2-hydroxy-propyl group, a 3-undecoxyethylene oxide-2-hydroxy-propyl group, a 3-undecoxy-2-hydroxy-propyl group, a 3-dodecoxyethylene oxide-2-hydroxy-propyl group, a 3-dodecoxy-2-hydroxy-propyl group, a 3-hexadecoxyethylene oxide-2-hydroxy-propyl group, a 3-hexadecoxy-2-hydroxy-propyl group, a 3-octadecoxyethylene oxide-2-hydroxy-propyl group, a 3-octadecoxy-2-hydroxy-propyl group, and the like. Here, the number of moles of the alkylene oxides added may be 0 or more and 50 or less. For example, the number of moles added in substituents having an oxyalkylene group such as ethylene oxide mentioned above includes substituents of 10, 12, 13, and 20 mol.

(Introduction Ratio)

In the modified cellulose fibers of the present invention, the introduction ratio of the substituent or substituents selected from substituents represented by the general formula (1) and substituents represented by the general formula (2) defined above, per mol of the anhydrous glucose unit of the cellulose, is preferably 0.001 mol or more, more preferably 0.005 mol or more, even more preferably 0.01 mol or more, even more preferably 0.05 mol or more, even more preferably 0.1 mol or more, even more preferably 0.2 mol or more, even more preferably 0.3 mol or more, and even more preferably 0.4 mol or more, from the viewpoint of affinity to the solvent. In addition, the introduction ratio is preferably 1.5 mol or less, more preferably 1.3 mol or less, even more preferably 1.0 mol or less, even more preferably 0.8 mol or less, even more preferably 0.6 mol or less, and even more preferably 0.5 mol or less, from the viewpoint of having cellulose I crystal structure and exhibiting strength. Here, when both of the substituent represented by the general formula (1) and the substituent represented by the general formula (2) are introduced, the introduction ratio refers to a total introduction molar ratio. The introduction ratio as used herein can be measured in accordance with the method described in Examples set forth below, which may be also described as an introduction molar ratio or modification ratio.

(Crystallinity)

The crystallinity of the modified cellulose fibers is preferably 10% or more, more preferably 15% or more, and even more preferably 20% or more, from the viewpoint of exhibiting strength. Also, the crystallinity is preferably 90% or less, more preferably 85% or less, even more preferably 80% or less, and even more preferably 75% or less, from the viewpoint of availability of the raw materials. Here, the crystallinity of the cellulose as used herein refers to a cellulose I crystallinity which is calculated from diffraction intensity values according to X-ray diffraction method, which can be measured by the method described in Examples set forth below. Here, the cellulose I refers to a crystal form of natural cellulose, and the cellulose I crystallinity means a proportion of the amount of crystalline region that occupies the entire cellulose. In addition, the modified cellulose fibers do not greatly fluctuate in crystallinity and cellulose crystal forms by the presence or absence of the finely fibrillating treatment.

[Method for Producing Modified Cellulose Fibers]

In the modified cellulose fibers of the present invention, the above substituent is bonded to the surface of the cellulose fibers via an ether bond as mentioned above, and the introduction of the substituent can be carried out in accordance with a known method without particular limitations.

Specifically, the cellulose-based raw material may be reacted with a compound having the above substituent in the presence of a base.

(Cellulose-Based Raw Material)

The cellulose-based raw material usable in the present invention includes, but not particularly limited to, woody raw materials (needle-leaf trees and broad-leaf trees); grassy raw materials (plant raw materials of Gramineae, Malvaceae, and Fabaceae, non-woody raw materials of plants of Palmae); pulps (cotton linter pulps obtained from fibers surrounding the cottonseeds, etc.); and papers (newspapers, corrugated cardboards, magazines, high-quality paper, etc.). Among them, woody and grassy raw materials are preferred, from the viewpoint of availability and costs.

The shape of the cellulose-based raw material is, but not particularly limited to, preferably fibrous, powdery, spherical, chip-like, or flaky, from the viewpoint of handling property. Also, it may be a mixture of these shapes.

In addition, the cellulose-based raw material can be previously subjected to at least one pretreatment selected from biochemical treatment, chemical treatment, and mechanical treatment, from the viewpoint of handing property and the like. In the biochemical treatment, the chemical used is not particularly limited, and the biochemical treatment includes, for example, a treatment using an enzyme such as endoglucanase, exoglucanase, or beta-glucosidase. In the chemical treatment, the chemical used is not particularly limited, and the chemical treatment includes, for example, an acid treatment with hydrochloric acid, sulfuric acid, or the like, and an oxidation treatment with hydrogen peroxide, ozone, or the like. In the mechanical treatment, the machines used and the treatment conditions are not particularly limited, and examples include roll mills such as high-pressure compression roll mills and roll-rotating mills, vertical roller mills such as ring roller mills, roller race mills or ball race mills, vessel driving medium mills such as tumbling ball mills, vibrating ball mills, vibrating rod mills, vibrating tube mills, planetary ball mills, or centrifugal fluidized bed mills, media agitating mills such as tower pulverizers, agitation tank-containing mills, flow tank-containing mills or annular mills, compact shearing mills such as high-speed centrifugal roller mills or angmills, mortar, millstone, Masscolloider, fret mills, edge-runner mills, knife mills, pin mills, cutter mills, and the like.

In addition, during the above mechanical treatment, the shape transformation by mechanical treatment can also be accelerated by adding an aid such as a solvent such as water, ethanol, isopropyl alcohol, t-butyl alcohol, toluene, or xylene, a plasticizer such as a phthalic acid compound, an adipic acid compound, or a trimellitic acid compound, a hydrogen bonding-inhibitor such as urea, an alkali (alkaline earth) metal hydroxide, or an amine-based compound. By adding the shape transformation as described above, the handling property of the cellulose-based raw materials is improved, which makes the introduction of a substituent favorable, which in turn makes it possible to also improve the physical properties of the modified cellulose fibers obtained. The amount of the additive aid used varies depending upon the additive aid used, a method of the mechanical treatment used or the like, and the amount used, based on 100 parts by mass of the raw material is usually 5 parts by mass or more, preferably 10 parts by mass or more, and more preferably 20 parts by mass or more, from the viewpoint of exhibiting the effect of accelerating the shape transformation, and the amount used is usually 10,000 parts by mass or less, preferably 5,000 parts by mass or less, and more preferably 3,000 parts by mass or less, from the viewpoint of exhibiting the effect of accelerating the shape transformation and from the viewpoint of economic advantages.

The average fiber size of the cellulose-based raw material is, but not particularly limited to, preferably 5 µm or more, more preferably 7 µm or more, even more preferably 10 µm or more, and even more preferably 15 µm or more, from the viewpoint of handling property and costs. In addition, the upper limit is, but not particularly set, preferably 10,000 µm or less, more preferably 5,000 µm or less, even more preferably 1,000 µm or less, even more preferably 500 µm or less, and still even more preferably 100 µm or less, from the viewpoint of handling property.

In addition, the previously finely fibrillated cellulose-based raw material may be used, from the viewpoint of reduction of production steps, and the average fiber size in that case is preferably 1 nm or more, more preferably 2 nm or more, even more preferably 3 nm or more, and even more preferably 10 nm or more, from the viewpoint of improvement in heat resistance. In addition, the upper limit is, but not particularly set to, preferably 500 nm or less, more preferably 300 nm or less, even more preferably 200 nm or less, even more preferably 100 nm or less, and still even more preferably 80 nm or less, from the viewpoint of handling property.

The average fiber size of the cellulose-based raw material can be measured in the same manner as the modified cellulose fibers mentioned above. The details are as described in Examples.

The composition of the cellulose-based raw material is not particularly limited. It is preferable that the cellulose content in the cellulose-based raw material is preferably 30% by mass or more, more preferably 50% by mass or more, and even more preferably 70% by mass or more, from the viewpoint of obtaining cellulose fibers, and the cellulose content is preferably 99% by mass or less, more preferably 98% by mass or less, even more preferably 95% by mass or less, and even more preferably 90% by mass or less, from the viewpoint of availability. Here, the cellulose content in the cellulose-based raw material refers to a cellulose content in the remainder component after removing water in the cellulose-based raw material.

In addition, the water content in the cellulose-based raw material is, but not particularly limited to, preferably 0.01% by mass or more, more preferably 0.1% by mass or more, even more preferably 0.5% by mass or more, even more preferably 1.0% by mass or more, even more preferably 1.5% by mass or more, and even more preferably 2.0% by mass or more, from the viewpoint of availability and costs, and the water content is preferably 50% by mass or less, more preferably 40% by mass or less, even more preferably 30% by mass or less, and even more preferably 20% by mass or less, from the viewpoint of handling property.

(Base)

In the present invention, the above cellulose-based raw material is mixed with a base.

The base usable in the present invention is, but not particularly limited to, preferably one or more members selected from the group consisting of alkali metal hydroxides, alkaline earth metal hydroxides, primary to tertiary amines, quaternary ammonium salts, imidazoles and derivatives thereof, pyridine and derivatives thereof, and alkoxides, from the viewpoint of progressing etherification reaction.

The alkali metal hydroxide and the alkaline earth metal hydroxide include sodium hydroxide, potassium hydroxide, lithium hydroxide, calcium hydroxide, barium hydroxide, and the like.

The primary to tertiary amines refer to primary amines, secondary amines, and tertiary amines, and specific examples include ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, triethylamine, and the like.

The quaternary ammonium salt includes tetrabutylammonium hydroxide, tetrabutylammonium chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, tetramethylammonium bromide, and the like.

The imidazole and derivatives thereof include 1-methylimidazole, 3-aminopropylimidazole, carbonyldiimidazole, and the like.

The pyridine and derivatives thereof include N,N-dimethyl-4-aminopyridine, picoline, and the like.

The alkoxide includes sodium methoxide, sodium ethoxide, potassium t-butoxide, and the like.

The amount of the base, based on the anhydrous glucose unit of the cellulose-based raw material, is preferably 0.01 equivalents or more, more preferably 0.05 equivalents or more, even more preferably 0.1 equivalents or more, and even more preferably 0.2 equivalents or more, from the viewpoint of progressing the etherification reaction, and the amount of the base is preferably 10 equivalents or less, more preferably 8 equivalents or less, even more preferably 5 equivalents or less, and even more preferably 3 equivalents or less, from the viewpoint of production costs.

Here, the mixing of the above cellulose-based raw material and the base may be carried out in the presence of a solvent. The solvent includes, but not particularly limited to, for example, water, isopropanol, t-butanol, dimethylformamide, toluene, methyl isobutyl ketone, acetonitrile, dimethyl sulfoxide, dimethylacetamide, 1,3-dimethyl-2-imidazolidinone, hexane, 1,4-dioxane, and mixtures thereof.

The mixing of the cellulose-based raw material and the base is not limited in the temperature and time, so long as the components can be homogeneously mixed.

(Compound Having Substituent)

Next, a mixture of the cellulose-based raw material and the base obtained above is reacted with one or more compounds selected from a compound having a substituent represented by the above general formula (1) and a compound having a substituent represented by the general formula (2) defined above as a compound having a substituent. The compound is not particularly limited, so long as the compound is capable of bonding the above substituent during the reaction with the cellulose-based raw material, and in the present invention, it is preferable to use a compound having a cyclic structure group having reactivity, from the viewpoint of reactivity and a non-halogen-containing compound, and a compound having an epoxy group is preferably used. Each of the compounds will be exemplified hereinbelow.

As the compound having a substituent represented by the general formula (1), for example, a nonionic alkylene oxide compound represented by the following general formula (1A):

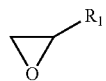

(1A)

wherein $R_1$ is a linear or branched alkyl group having 3 or more carbon atoms and 30 or less carbon atoms.
is preferred. The compound may be one prepared by a known technique, or a commercially available product may be used. A total number of carbon atoms of the compound is 5 or more, preferably 6 or more, more preferably 8 or more, and even more preferably 12 or more, from the viewpoint of mechanical strength, dimensional stability, and heat resistance, and a total number of carbon atoms is 32 or less, preferably 27 or less, more preferably 22 or less, even more preferably 20 or less, even more preferably 18 or less, even more preferably 14 or less, and even more preferably 12 or less, from the viewpoint of mechanical strength, dimensional stability, and heat resistance.

$R_1$ in the general formula (1A) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, and even more preferably 10 or more, from the viewpoint of mechanical strength, dimensional stability, and heat resistance, and the number of carbon atoms is preferably 25 or less, more preferably 20 or less, even more preferably 18 or less, even more preferably 16 or less, even more preferably 12 or less, and even more preferably 10 or less, from the viewpoint of mechanical strength, dimensional stability, and heat resistance. Specific examples include those listed in the section of $R_1$ in the substituent represented by the general formula (1).

Specific examples of the compound represented by the general formula (1A) include 1,2-epoxyhexane, 1,2-epoxydecane, and 1,2-epoxyoctadecane.

The compound having a substituent represented by the general formula (2) is, for example, preferably a nonionic glycidyl ether compound represented by the following general formula (2A):

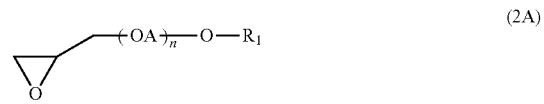

(2A)

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is a number of 0 or more and 50 or less. The compound may be one prepared by a known technique, or a commercially available product may be used. A total number of carbon atoms of the compound is 5 or more, preferably 6 or more, more preferably 10 or more, and even more preferably 20 or more, from the viewpoint of mechanical strength, dimensional stability, and heat resistance, and a total number of carbon atoms is 100 or less, preferably 75 or less, more preferably 50 or less, and even more preferably 25 or less, from the viewpoint of mechanical strength, dimensional stability, and heat resistance.

$R_1$ in the general formula (2A) is a linear or branched alkyl group having 3 or more carbon atoms and 30 or less carbon atoms. The number of carbon atoms of the alkyl group is 3 or more and 30 or less, and the number of carbon atoms is preferably 4 or more, and more preferably 6 or more, from the viewpoint of mechanical strength, dimensional stability, and heat resistance, and the number of carbon atoms is preferably 27 or less, more preferably 22 or less, even more preferably 20 or less, even more preferably 18 or less, even more preferably 16 or less, and even more preferably 12 or less, from the viewpoint of mechanical strength, dimensional stability, and heat resistance. Specific examples include those listed in the section of $R_1$ in the substituent represented by the general formula (2).

A in the general formula (2A) is a linear or branched, divalent saturated hydrocarbon group having 1 or more carbon atoms and 6 or less carbon atoms, which forms an oxyalkylene group with an adjoining oxygen atom. The number of carbon atoms of A is 1 or more and 6 or less, and the number of carbon atoms is preferably 2 or more, from the viewpoint of availability and costs, and the number of carbon atoms is preferably 4 or less, and more preferably 3 or less, from the same viewpoint. Specific examples include those listed in the section of A in the substituent represented by the general formula (2), among which an ethylene group and a propylene group are preferred, and an ethylene group is more preferred.

n in the general formula (2A) is the number of moles of alkylene oxides added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint.

Specific examples of the compound represented by the general formula (2A) include butyl glycidyl ether, 2-ethylhexyl glycidyl ether, dodecyl glycidyl ether, stearyl glycidyl ether, and polyoxyalkylene alkyl ethers.

The amount of the above compound can be determined by a desired introduction ratio of the substituent represented by the general formula (1) and/or the substituent represented by the general formula (2) defined above in the modified cellulose fibers obtained, and the amount of the compound, based on the anhydrous glucose unit of the cellulose-based raw material, is preferably 0.01 equivalents or more, more preferably 0.1 equivalents or more, even more preferably 0.3 equivalents or more, even more preferably 0.5 equivalents or more, and even more preferably 1.0 equivalent or more, from the viewpoint of reactivity, and the amount is preferably 10 equivalents or less, more preferably 8 equivalents or less, even more preferably 6.5 equivalents or less, and even more preferably 5 equivalents or less, from the viewpoint of production costs.

(Ether Reaction)

The ether reaction of the above compound and the cellulose-based raw material can be carried out by mixing both the components in the presence of a solvent. The solvent is not particularly limited, and solvents which are exemplified as being usable in the presence of the above base can be used.

The amount of the solvent used is not unconditionally determined because the amount depends upon the kinds of the cellulose-based raw material and the above compound having a substituent, and the amount used, based on 100 parts by mass of the cellulose-based raw material, is preferably 30 parts by mass or more, more preferably 50 parts by mass or more, even more preferably 75 parts by mass or more, even more preferably 100 parts by mass or more, and even more preferably 200 parts by mass or more, from the viewpoint of reactivity, and the amount used is preferably 10,000 parts by mass or less, more preferably 5,000 parts by mass or less, even more preferably 2,500 parts by mass or less, even more preferably 1,000 parts by mass or less, and even more preferably 500 parts by mass or less, from the viewpoint of productivity.

The mixing conditions are not particularly limited so long as the cellulose-based raw material and the above compound having a substituent are homogeneously mixed, so that the reaction can be sufficiently progressed, and continuous mixing treatment may or may not be carried out. In a case where a relatively large reaction vessel having a size exceeding 1 L is used, stirring may be appropriately carried out from the viewpoint of controlling the reaction temperature.

The reaction temperature is not unconditionally determined because the reaction temperature depends upon the kinds of the cellulose-based raw material and the above compound having a substituent and an intended introduction ratio, and the reaction temperature is preferably 40° C. or higher, more preferably 50° C. or higher, and even more preferably 60° C. or higher, from the viewpoint of improving reactivity, and the reaction temperature is preferably 120° C. or lower, more preferably 110° C. or lower, and even more preferably 100° C. or lower, from the viewpoint of inhibiting pyrolysis.

The reaction time is not unconditionally determined because the reaction time depends upon the kinds of the cellulose-based raw material and the above compound having a substituent and an intended introduction ratio, and the reaction time is preferably 3 hours or more, more preferably 6 hours or more, and even more preferably 10 hours or more, from the viewpoint of reactivity, and the reaction time is preferably 60 hours or less, more preferably 48 hours or less, and even more preferably 36 hours or less, from the viewpoint of productivity.

In addition, after the above reaction, for example, the same treatment as the pretreatment to which the cellulose-based raw material may be subjected is carried out for the reaction mixture to form into chips, flaky, and powdery shapes, from the viewpoint of handling property. By having the shape transformation by the treatment, when the modified cellulose fibers of the present invention obtained are added to the resin composition, the physical properties such as Young's modulus of the resin composition can be improved.

Furthermore, the modified cellulose fibers of the present invention may be subjected to a known finely fibrillating treatment after the above reaction, to be finely fibrillated. For example, the modified cellulose fibers can be finely fibrillated by carrying out a treatment with a high-pressure homogenizer or the like in an organic solvent. In addition, the fine modified cellulose fibers can be obtained by carrying out an introduction reaction of the above substituent with a cellulose-based raw material which is previously subjected to a finely fibrillating treatment, and it is preferable that fine fibrillation is carried out by a known finely fibrillating treatment after the reaction of introduction of the above substituent, from the viewpoint of mechanical strength, dimensional stability, and heat resistance.

Specifically, for example, in a case where modified cellulose fibers having an average fiber size of 5 μm or more are obtained, a mechanical treatment can be carried out with a vessel driving medium mill, a media agitating mill or the like. Alternatively, in a case where modified cellulose fibers having an average fiber size of 1 nm or more and 500 nm or less are obtained, a treatment with a high-pressure homogenizer or the like in an organic solvent can be carried out.

After the reaction, a post-treatment can be appropriately carried out in order to remove an unreacted compound, an unreacted base, or the like. As the method for post-treatment, for example, an unreacted base can be neutralized with an acid (an organic acid, an inorganic acid, etc.), and thereafter washed with a solvent that dissolves the unreacted compound or base. As desired, drying (vacuum drying etc.) may be further carried out.

Thus, the modified cellulose fibers of the present invention are obtained. Accordingly, a preferred method for producing modified cellulose fibers of the present invention includes, for example, an embodiment characterized by introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base.

The modified cellulose fibers obtained have a state in which the substituent represented by the general formula (1)

and/or the substituent represented by the general formula (2) is ether-bonded on the cellulose fiber surface. Specific examples include, for example, modified cellulose fibers represented by the following general formula (3):

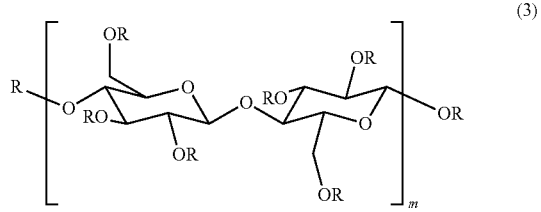

wherein R, which may be identical or different, is hydrogen, or a substituent selected from substituents represented by the general formula (1) defined above and substituents represented by the general formula (2) defined above; and m is an integer of 20 or more and 3,000 or less, with proviso that a case where all R's are simultaneously hydrogens is excluded.

In the modified cellulose fibers represented by the general formula (3), R, which may be identical or different, is hydrogen or a substituent represented by the general formula (1) and/or a substituent represented by the general formula (2), which has a repeating structure of cellulose unit into which the above substituent is introduced. As the number of repeats of the repeating structure, m in the general formula (3) may be an integer of 20 or more and 3,000 or less, and m is preferably 100 or more and 2,000 or less, from the viewpoint of mechanical strength, dimensional stability, and heat resistance.

[(A) Resin]

The resin components in the present invention contain (A) one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin.

The thermoplastic resin includes saturated polyester-based resins such as polylactic acid resins; olefinic resins such as polyethylene-based resins, polypropylene-based resins, and ABS resins; cellulose-based resins such as triacetylated cellulose and diacetylated cellulose; nylon resins; vinyl chloride resins; styrene resins; vinyl ether resins; polyvinyl alcohol resins; polyamide-based resins; polycarbonate-based resins; polysulfonate-based resins, and the like. The curable resin includes epoxy resins, (meth)acrylic resins, phenolic resins, unsaturated polyester resins, polyurethane resins, or polyimide resins. These resins may be used alone or as a mixed resin of two or more kinds. Here, the term (meth)acrylic resin as used herein means to embrace methacrylic resins and acrylic resins.

The resin can be subjected to photo-cure treatment and/or heat-cure treatment, depending upon the kinds of the resins.

In the photo-curable treatment, the polymerization reaction is allowed to progress using a photopolymerization initiator which generates a radical or a cation by active energy ray irradiation of ultraviolet rays or electron beams.

The above photopolymerization initiator includes, for example, acetophenones, benzophenones, ketals, anthraquinones, thioxanthones, azo compounds, peroxides, 2,3-dialkyldione compounds, disulfide compounds, thiuram compounds, fluoroamine compounds, and the like. More specific examples include 1-hydroxy-cyclohexyl-phenyl-ketone, 2-methyl-1[4-(methylthio)phenyl]-2-morpholinopropan-1-one, benzyl methyl ketone, 1-(4-dodecylphenyl)-2-hydroxy-2-methylpropan-1-one, 1-(4-isopropylphenyl)-2-hydroxy-2-hydroxy-2-methylpropan-1-one, benzophenone, and the like.

With the photopolymerization initiator, for example, a monomer (monofunctional monomer and/or polyfunctional monomer), or an oligomer or resin or the like, having a reactive unsaturated group can be polymerized.

When an epoxy resin is used in the above resin component, it is preferable to use a curing agent. By blending a curing agent, molding materials obtained from the resin composition can be firmly molded, whereby the mechanical strength can be improved. Here, the content of the curing agent may be appropriately set depending upon the kinds of the curing agents used.

The content of each component in the resin composition of the present invention which may depend upon the kinds of the resins, is as follows.

The content of the resin in the resin composition of the present invention is preferably 50% by mass or more, more preferably 60% by mass or more, even more preferably 70% by mass or more, even more preferably 80% by mass or more, and even more preferably 85% by mass or more, from the viewpoint of producing a molded article, and the content is preferably 99.5% by mass or less, more preferably 99% by mass or less, even more preferably 98% by mass or less, and even more preferably 95% by mass or less, from the viewpoint of containing the modified cellulose fibers.

The content of the modified cellulose fibers in the resin composition of the present invention is preferably 0.5% by mass or more, more preferably 1% by mass or more, even more preferably 2% by mass or more, and even more preferably 5% by mass or more, from the viewpoint of mechanical strength, dimensional stability, and heat resistance of the resin composition obtained, and the content is preferably 50% by mass or less, more preferably 40% by mass or less, even more preferably 30% by mass or less, even more preferably 20% by mass or less, and even more preferably 15% by mass or less, from the viewpoint of moldability and costs of the resin composition obtained.

The amount of the modified cellulose fibers in the resin composition of the present invention, based on 100 parts by mass of the resin, is preferably 0.5 parts by mass or more, more preferably 1 part by mass or more, even more preferably 2 parts by mass or more, and still even more preferably 5 parts by mass or more, from the viewpoint of mechanical strength, dimensional stability, and heat resistance of the resin composition obtained, and the content is preferably 100 parts by mass or less, more preferably 70 parts by mass or less, even more preferably 45 parts by mass or less, even more preferably 25 parts by mass or less, and even more preferably 20 parts by mass or less, from the viewpoint of moldability and costs of the resin composition obtained.

The resin composition of the present invention can contain other components besides those mentioned above a compatibilizing agent; a plasticizer; a crystal nucleating agent; a filler including an inorganic filler and an organic filler; a hydrolysis inhibitor; a flame retardant; an antioxidant; a lubricant such as a hydrocarbon-based wax or an anionic surfactant; an ultraviolet absorbent; an antistatic agent; an anti-clouding agent; a photostabilizer; a pigment; a mildewproof agent; a bactericidal agent; a blowing agent; a surfactant; a polysaccharide such as starch or alginic acid; a natural protein such as gelatin, glue, or casein; an inorganic compound such as tannin, zeolite, ceramics, or metal powder; a perfume; a flowability modulator; a leveling agent; an electroconductive agent; a ultraviolet dispersant; a deodorant; or the like, within the range that would not impair the effects of the present invention. The compatibilizing agent includes a compound composed of a polar group having a high affinity with the cellulose and a hydrophobic group having a high affinity with the resin. More specifically, examples of the polar group include, for example, maleic anhydride, maleic acid, and glycidyl methacrylate, and examples of the hydrophobic group include, for example, polypropylene, polyethylene, and the like. Similarly, other polymer materials and other resin compositions can be added within the range that would not impair the effects of the present invention. As the content proportion of the optional additive, the optional additive may be properly contained within the range that would not impair the effects of the present invention. For example, the content proportion in the resin composition is preferably 20% by mass or less, more preferably 10% by mass or less or so, and even more preferably 5% by mass or less or so.

The resin composition of the present invention can be prepared without particular limitations, so long as the resin composition contains the above resin and the modified cellulose fibers. For example, the resin composition can be prepared by stirring raw materials containing the above resin and the modified cellulose fibers, and further optionally various additives with a Henschel mixe or the like, melt-kneading the raw materials with a known kneader such as a tightly closed kneader, a single-screw or twin-screw extruder, or an open roller-type kneader, or subjecting to a solvent casting method.

Accordingly, the present invention also provides a method for producing a resin composition of the present invention.

The method for producing a resin composition of the present invention is not particularly limited, so long as the method includes the step of mixing the above resin and the modified cellulose fibers of the present invention. For example, examples of a preferred method for production include a method including the following steps:

step (1): introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, to provide modified cellulose fibers; and step (2): mixing the modified cellulose fibers obtained in the step (1), with one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin.

In the step (1), the modified cellulose fibers of the present invention are prepared. For details, the section of the method for producing modified cellulose fibers of the present invention can be referred. Here, the modified cellulose fibers obtained can be also subjected a subsequent step after subjecting them to a known finely fibrillating treatment.

In the step (2), the modified cellulose fibers obtained in the step (1) are mixed with the above resin. For example, a mixture can be prepared by subjecting raw materials containing the above resins and the modified cellulose fibers, and further optionally various additives to melt-kneading with a known kneader or a solvent casting method. The conditions for melt-kneading and solution mixing, i.e. temperature, time, can be appropriately set in accordance with known techniques depending upon the kinds of the resins used.

The resin composition of the present invention thus obtained has favorable workability and excellent heat resistance, so that the resin composition can be suitably used in various applications such as daily sundries, household electric appliance parts, packaging materials for household electric appliance parts, automobile parts, and resins for three-dimensional modeling.

With respect to the above-mentioned embodiments, the present invention further discloses the following resin compositions and methods for producing the resin compositions.

<1> A resin composition containing:
(A) one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin; and
(B) modified cellulose fibers wherein one or more substituents selected from substituents represented by the following general formula (1) and substituents represented by the following general formula (2):

$$-CH_2-CH(OH)-R_1 \qquad (1)$$

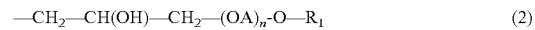

$$-CH_2-CH(OH)-CH_2-(OA)_n-O-R_1 \qquad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms,
are bonded to cellulose fibers via an ether bond, wherein the modified cellulose fibers have a cellulose I crystal structure.

<2> The resin composition according to the above <1>, wherein the average fiber size of the modified cellulose fibers is preferably 5 μm or more, more preferably 7 μm or more, and even more preferably 10 μm or more, and preferably 100 μm or less, more preferably 70 μm or less, even more preferably 50 μm or less, even more preferably 40 μm or less, and even more preferably 30 μm or less.

<3> The resin composition according to the above <1>, wherein the average fiber size of the modified cellulose fibers is preferably 3 nm or more, more preferably 10 nm or more, and even more preferably 20 nm or more, and preferably 300 nm or less, more preferably 200 nm or less, even more preferably 150 nm or less, and still even more preferably 120 nm or less.

<4> The resin composition according to any one of the above <1> to <3>, wherein the number of carbon atoms of $R_1$ in the general formula (1) is preferably 4 or more, more preferably 6 or more, and even more preferably 10 or more, and preferably 25 or less, more preferably 20 or less, even more preferably 18 or less, even more preferably 16 or less, even more preferably 12 or less, and still even more preferably 10 or less.

<5> The resin composition according to any one of the above <1> to <4>, wherein the number of carbon atoms of $R_1$ in the general formula (2) is preferably 4 or more, and more preferably 6 or more, and preferably 27 or less, more preferably 22 or less, even more preferably 20 or less, even more preferably 18 or less, even more preferably 16 or less, and even more preferably 12 or less.

<6> The resin composition according to any one of the above <1> to <5>, wherein the number of carbon atoms of A in the general formula (2) is preferably 2 or more, and preferably 4 or less, and more preferably 3 or less.

<7> The resin composition according to any one of the above <1> to <6>, wherein A in the general formula (2) is preferably a group selected from the group consisting of a methylene group, an ethylene group, a propylene group, a butylene group, a pentylene group, and a hexylene group, an ethylene group and a propylene group are more preferred, and an ethylene group is even more preferred.

<8> The resin composition according to any one of the above <1> to <7>, wherein n in the general formula (2) is preferably 3 or more, more preferably 5 or more, and even more preferably 10 or more, and preferably 40 or less, more preferably 30 or less, even more preferably 20 or less, and even more preferably 15 or less.

<9> The resin composition according to any one of the above <1> to <8>, wherein the combination of A and n in the general formula (2) is preferably a combination in which A is a linear or branched, divalent saturated hydrocarbon group having 2 or more carbon atoms and 3 or less carbon atoms, and n is a number of 0 or more and 20 or less, and more preferably a combination in which A is a linear or branched, divalent saturated hydrocarbon group having 2 or more carbon atoms and 3 or less carbon atoms, and n is a number of 5 or more and 15 or less.

<10> The resin composition according to any one of the above <1> to <9>, wherein the substituent represented by the general formula (1) is preferably a group selected from a propylhydroxyethyl group, a butylhydroxyethyl group, a pentylhydroxyethyl group, a hexylhydroxyethyl group, a heptylhydroxyethyl group, an octylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an icosylhydroxyethyl group, and a triacontylhydroxyethyl group.

<11> The resin composition according to any one of the above <1> to <10>, wherein the substituent represented by the general formula (2) is preferably a group selected from a 3-butoxy-2-hydroxy-propyl group, a 3-hexoxyethylene oxide-2-hydroxy-propyl group, a 3-hexoxy-2-hydroxy-propyl group, a 3-octoxyethylene oxide-2-hydroxy-propyl group, a 3-octoxy-2-hydroxy-propyl group, a 6-ethyl-3-hexoxy-2-hydroxy-propyl group, a 6-ethyl-3-hexoxyethylene oxide-2-hydroxy-propyl group, a 3-decoxyethylene oxide-2-hydroxy-propyl group, a 3-decoxy-2-hydroxy-propyl group, a 3-undecoxyethylene oxide-2-hydroxy-propyl group, a 3-undecoxy-2-hydroxy-propyl group, a 3-dodecoxyethylene oxide-2-hydroxy-propyl group, a 3-dodecoxy-2-hydroxy-propyl group, a 3-hexadecoxyethylene oxide-2-hydroxy-propyl group, a 3-hexadecoxy-2-hydroxy-propyl group, a 3-octadecoxyethylene oxide-2-hydroxy-propyl group, and a 3-octadecoxy-2-hydroxy-propyl group.

<12> The resin composition according to any one of the above <1> to <11>, wherein the introduction ratio of the substituents selected from the substituents represented by the general formula (1) and/or the substituents represented by the general formula (2) as defined above, per mol of the anhydrous glucose unit of the cellulose, is preferably 0.001 mol or more, more preferably 0.005 mol or more, even more preferably 0.01 mol or more, even more preferably 0.05 mol or more, even more preferably 0.1 mol or more, even more preferably 0.2 mol or more, even more preferably 0.3 mol or more, and even more preferably 0.4 mol or more, and preferably 1.5 mol or less, more preferably 1.3 mol or less, even more preferably 1.0 mol or less, even more preferably 0.8 mol or less, even more preferably 0.6 mol or less, and even more preferably 0.5 mol or less.

<13> The resin composition according to any one of the above <1> to <12>, wherein the crystallinity of the modified cellulose fibers is preferably 10% or more, more preferably 15% or more, and even more preferably 20% or more, and preferably 90% or less, more preferably 85% or less, even more preferably 80% or less, and even more preferably 75% or less.

<14> The resin composition according to any one of the above <1> to <13>, wherein the modified cellulose fibers are represented by the following general formula (3):

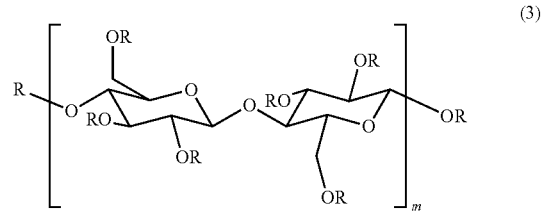

wherein R, which may be identical or different, is hydrogen, or a substituent selected from substituents represented by the general formula (1) defined above and substituents represented by the general formula (2) defined above; and m is an integer of 20 or more and 3,000 or less, with proviso that a case where all R's are simultaneously hydrogens is excluded.

<15> The resin composition according to any one of the above <1> to <14>, wherein in the modified cellulose fibers represented by the general formula (3), R, which may be identical or different, is hydrogen, or a substituent represented by the general formula (1) and/or a substituent represented by the general formula (2), with proviso that a case where all R's are simultaneously hydrogens is excluded, wherein the modified cellulose fibers have a repeating structure of cellulose units into which the substituent is introduced, and wherein m in the general formula (3) is preferably 100 or more and 2,000 or less.

<16> The resin composition according to any one of the above <1> to <15>, wherein the thermoplastic resin is preferably a saturated polyester-based resin, an olefinic resin, a cellulose-based resin, a nylon resin, a vinyl chloride resin, a styrene resin, a vinyl ether resin, a polyvinyl alcohol resin; a polyamide-based resin; a polycarbonate-based resin; a polysulfonate-based resin, wherein the saturated polyester-based resin is preferably a polylactic acid resin, and the olefinic resin is preferably a polyethylene-based resin or a polypropylene-based resin, <17> The resin composition according to any one of the above <1> to <16>, wherein the curable resin is preferably an epoxy resin, a (meth)acrylic resin, a phenolic resin, an unsaturated polyester resin, a polyurethane resin, or a polyimide resin.

<18> The resin composition according to any one of the above <1> to <17>, wherein the resin composition can be subjected to photo-cure treatment and/or heat-cure treatment.

<19> The resin composition according to the above <18>, wherein a photopolymerization initiator is used in the photo-cure treatment.

<20> The resin composition according to the above <19>, wherein the photopolymerization initiator is preferably acetophenones, benzophenones, ketals, anthraquinones, thioxanthones, azo compounds, peroxides, 2,3-dialkyldione compounds, disulfide compounds, thiuram compounds, and fluoroamine compounds, and more preferably 1-hydroxy-cyclohexyl-phenyl-ketone, 2-methyl-1 [4-(methylthio)phenyl]-2-morpholinopropan-1-one, benzyl methyl ketone, 1-(4-dodecylphenyl)-2-hydroxy-2-methylpropan-1-one, 1-(4-isopropylphenyl)-2-hydroxy-2-hydroxy-2-methylpropan-1-one, and benzophenone.

<21> The resin composition according to any one of the above <1> to <20>, wherein a curing agent is used.

<22> The resin composition according to any one of the above <1> to <21>, wherein the content of the resin in the resin composition is preferably 50% by mass or more, more preferably 60% by mass or more, even more preferably 70% by mass or more, even more preferably 80% by mass or more, and even more preferably 85% by mass or more, and preferably 99.5% by mass or less, more preferably 99% by mass or less, even more preferably 98% by mass or less, and even more preferably 95% by mass or less.

<23> The resin composition according to any one of the above <1> to <22>, wherein the content of the modified cellulose fibers in the resin composition is preferably 0.5% by mass or more, more preferably 1% by mass or more, even more preferably 2% by mass or more, and even more preferably 5% by mass or more, and preferably 50% by mass or less, more preferably 40% by mass or less, even more preferably 30% by mass or less, even more preferably 20% by mass or less, and even more preferably 15% by mass or less.

<24> The resin composition according to any one of the above <1> to <23>, wherein the amount of the modified cellulose fibers in the resin composition, based on 100 parts by mass of the resin, is preferably 0.5 parts by mass or more, more preferably 1 part by mass or more, even more preferably 2 parts by mass or more, and still even more preferably 5 parts by mass or more, and preferably 100 parts by mass or less, more preferably 70 parts by mass or less, even more preferably 45 parts by mass or less, even more preferably 25 parts by mass or less, and even more preferably 20 parts by mass or less.

<25> The resin composition according to any one of the above <1> to <24>, wherein the resin composition can contain, as other components besides those mentioned above, an additive selected from a compatibilizing agent; a plasticizer; a crystal nucleating agent; a filler including an inorganic filler and an organic filler; a hydrolysis inhibitor; a flame retardant; an antioxidant; a lubricant such as a hydrocarbon-based wax or an anionic surfactant; an ultraviolet absorbent; an antistatic agent; an anti-clouding agent; a photostabilizer; a pigment; a mildewproof agent; a bactericidal agent; a blowing agent; a surfactant; a polysaccharide such as starch or alginic acid; a natural protein such as gelatin, glue, or casein; an inorganic compound such as tannin, zeolite, ceramics, or metal powder; a perfume; a flowability modulator; a leveling agent; an electroconductive agent; a ultraviolet dispersant; and a deodorant.

<26> The resin composition according to any one of the above <1> to <25>, wherein the resin composition can be prepared by stirring raw materials containing one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin and the above modified cellulose fibers, and further optionally containing various additives with a Henschel mixer or the like, melt-kneading the raw materials with a known kneader such as a tightly closed kneader, a single-screw or twin-screw extruder, or an open roller-type kneader, or subjecting raw materials to a solvent casting method.

<27> A method for producing a resin composition, including the step of mixing one or more resins selected from the group consisting of thermoplastic resins and curable resins selected from epoxy resins, (meth)acrylic resins, phenol resins, unsaturated polyester resins, polyurethane resins, and polyimide resins, and modified cellulose fibers as defined in any one of the above <1> to <15>.

<28> The method for producing a resin composition according to the above <27>, including reacting a cellulose-based raw material with a compound selected from a compound having a substituent represented by the general formula (1) and a compound having a substituent represented by the general formula (2), in the presence of a base, in the modified cellulose fibers.

<29> The method for producing a resin composition according to the above <28>, wherein the average fiber size of the cellulose-based raw material is preferably. 5 μm or more, more preferably 7 μm or more, even more preferably 10 μm or more, and even more preferably 15 μm or more, and preferably 10,000 μm or less, more preferably 5,000 μm or less, even more preferably 1,000 μm or less, even more preferably 500 μm or less, and still even more preferably 100 μm or less.

<30> The method for producing a resin composition according to the above <28>, wherein the average fiber size of the cellulose-based raw material is preferably 1 nm or more, more preferably 2 nm or more, even more preferably 3 nm or more, and even more preferably 10 nm or more, and preferably 500 nm or less, more preferably 300 nm or less, even more preferably 200 nm or less, even more preferably 100 nm or less, and still even more preferably 80 nm or less.

<31> The method for producing a resin composition according to any one of the above <28> to <30>, wherein the cellulose content in the cellulose-based raw material is preferably 30% by mass or more, more preferably 50% by mass or more, and even more preferably 70% by mass or more, and preferably 99% by mass or less, more preferably 98% by mass or less, even more preferably 95% by mass or less, and even more preferably 90% by mass or less.

<32> The method for producing a resin composition according to any one of the above <28> to <31>, wherein the water content in the cellulose-based raw material is preferably 0.01% by mass or more, more preferably 0.1% by mass or more, even more preferably 0.5% by mass or more, even more preferably 1.0% by mass or more, even more preferably 1.5% by mass or more, and even more preferably 2.0% by mass or more, and preferably 50% by mass or less, more preferably 40% by mass or less, even more preferably 30% by mass or less, and even more preferably 20% by mass or less.

<33> The method for producing a resin composition according to any one of the above <28> to <32>, wherein the cellulose-based raw material is mixed with a base.

<34> The method for producing a resin composition according to any one of the above <28> to <33>, wherein the base is preferably one or more members selected from the group consisting of alkali metal hydroxides, alkaline earth metal hydroxides, primary to tertiary amines, quaternary ammonium salts, imidazole and derivatives thereof, pyridine and derivatives thereof, and alkoxides.

<35> The method for producing a resin composition according to the above <34>, wherein the alkali metal hydroxides and the alkaline earth metal hydroxide are selected from the group consisting of sodium hydroxide, potassium hydroxide, lithium hydroxide, calcium hydroxide, and barium hydroxide.

<36> The method for producing a resin composition according to the above <34>, wherein the primary to tertiary amines are selected from the group consisting of ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, and triethylamine.

<37> The method for producing a resin composition according to the above <34>, wherein the quaternary ammonium salt is selected from the group consisting of tetrabutylammonium hydroxide, tetrabutylammonium chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, and tetramethylammonium bromide.

<38> The method for producing a resin composition according to the above <34>, wherein the imidazole and derivatives thereof are selected from the group consisting of 1-methylimidazole, 3-aminopropylimidazole, and carbonyldiimidazole.

<39> The method for producing a resin composition according to the above <34>, wherein the pyridine and derivatives thereof are selected from the group consisting of N,N-dimethyl-4-aminopyridine and picoline.

<40> The method for producing a resin composition according to the above <34>, wherein the alkoxide is selected from the group consisting of sodium methoxide, sodium ethoxide, and potassium t-butoxide.

<41> The method for producing a resin composition according to any one of the above <28> to <40>, wherein the amount of the base, based on the anhydrous glucose unit of the cellulose-based raw material, is preferably 0.01 equivalents or more, more preferably 0.05 equivalents or more, even more preferably 0.1 equivalents or more, and even more preferably 0.2 equivalents or more, and preferably 10 equivalents or less, more preferably 8 equivalents or less, even more preferably 5 equivalents or less, and even more preferably 3 equivalents or less.

<42> The method for producing a resin composition according to any one of the above <28> to <41>, wherein the compound having a substituent represented by the general formula (1) is preferably a nonionic alkylene oxide compound represented by the following general formula (1A):

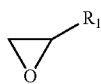

(1A)

wherein $R_1$ is a linear or branched alkyl group having 3 or more carbon atoms and 30 or less carbon atoms, and
wherein a total number of carbon atoms of the compound is 5 or more, preferably 6 or more, more preferably 8 or more, and even more preferably 12 or more, and 32 or less, preferably 27 or less, more preferably 22 or less, even more preferably 20 or less, even more preferably 18 or less, even more preferably 14 or less, and even more preferably 12 or less.

<43> The method for producing a resin composition according to the above <42>, wherein the number of carbon atoms of $R_1$ in the general formula (1A) is preferably 4 or more, more preferably 6 or more, and even more preferably 10 or more, and preferably 25 or less, more preferably 20 or less, even more preferably 18 or less, even more preferably 16 or less, even more preferably 12 or less, and even more preferably 10 or less.

<44> The method for producing a resin composition according to the above <42> or <43>, wherein the compound represented by the general formula (1A) is selected from the group consisting of 1,2-epoxyhexane, 1,2-epoxydecane, and 1,2-epoxyoctadecane.

<45> The method for producing a resin composition according to any one of the above <28> to <41>, wherein the compound having a substituent represented by the general formula (2) is preferably a nonionic glycidyl ether compound represented by the following general formula (2A):

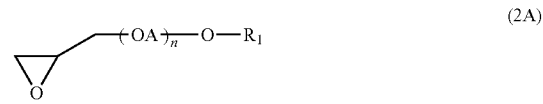

(2A)

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is a number of 0 or more and 50 or less, and wherein a total number of carbon atoms of the compound is 5 or more, preferably 6 or more, more preferably 10 or more, and even more preferably 20 or more, and 100 or less, preferably 75 or less, more preferably 50 or less, and even more preferably 25 or less.

<46> The method for producing a resin composition according to the above <45>, wherein the number of carbon atoms of $R_1$ in the general formula (2A) is preferably 4 or more, and more preferably 6 or more, and preferably 27 or less, more preferably 22 or less, even more preferably 20 or less, even more preferably 18 or less, even more preferably 16 or less, and even more preferably 12 or less.

<47> The method for producing a resin composition according to the above <45> or <46>, wherein the number of carbon atoms of A in the general formula (2A) is preferably 2 or more, and preferably 4 or less, and more preferably 3 or less.

<48> The method for producing a resin composition according to any one of the above <45> to <47>, wherein n in the general formula (2A) is preferably 3 or more, more preferably 5 or more, and even more preferably 10 or more, and preferably 40 or less, more preferably 30 or less, even more preferably 20 or less, and even more preferably 15 or less.

<49> The method for producing a resin composition according to any one of the above <45> to <48>, wherein the compound represented by the general formula (2A) is selected from the group consisting of butyl glycidyl ether, 2-ethylhexyl glycidyl ether, dodecyl glycidyl ether, stearyl glycidyl ether, and polyoxyalkylene alkyl ethers.

<50> The method for producing a resin composition according to any one of the above <27> to <49>, wherein the used amount of the compound having a substituent represented by the general formula (1) and/or the compound having a substituent represented by the general formula (2), based on the anhydrous glucose unit of the cellulose-based raw material, is preferably 0.01 equivalents or more, more preferably 0.1 equivalents or more, even more preferably 0.3 equivalents or more, even more preferably 0.5 equivalents or more, and even more preferably 0.1 equivalents or more, and preferably 10 equivalents or less, more preferably 8 equivalents or less, even more preferably 6.5 equivalents or less, and even more preferably 5 equivalents or less.

<51> The method for producing a resin composition according to any one of the above <28> to <50>, wherein as the solvent, water, isopropanol, t-butanol, dimethylformamide, toluene, methyl isobutyl ketone, acetonitrile, dimethyl sulfoxide, dimethylacetamide, 1,3-dimethyl-2-imidazolidinone, hexane, 1,4-dioxane, and mixtures thereof can be used.

<52> The method for producing a resin composition according to the above <51>, wherein the amount of solvent used, based on 100 parts by mass of the cellulose-based raw material, is preferably 30 parts by mass or more, more preferably 50 parts by mass or more, even more preferably 75 parts by mass or more, even more preferably 100 parts by mass or more, and even more preferably 200 parts by mass or more, and preferably 10,000 parts by mass or less, more preferably 5,000 parts by mass or less, even more preferably 2,500 parts by mass or less, even more preferably 1,000 parts by mass or less, and even more preferably 500 parts by mass or less.

<53> The method for producing a resin composition according to any one of the above <28> to <52>, wherein the reaction temperature is preferably 40° C. or higher, more preferably 50° C. or higher, and even more preferably 60° C. or higher, and preferably 120° C. or lower, more preferably 110° C. or lower, and even more preferably 100° C. or lower.

<54> The method for producing a resin composition according to any one of the above <28> to <53>, wherein the reaction time is preferably 3 hours or more, more preferably 6 hours or more, and even more preferably 10 hours or more, and preferably 60 hours or less, more preferably 48 hours or less, and even more preferably 36 hours or less.

<55> The method for producing a resin composition according to any one of the above <28> to <54>, including, after the above reaction, further carrying out a known finely fibrillating treatment.

<56> The method for producing a resin composition according to any one of the above <27> to <55>, including the following steps of:
step (1): introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, to provide modified cellulose fibers; and
step (2): mixing the modified cellulose fibers obtained in the step (1) with one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin.

<57> The resin composition according to any one of the above <1> to <26>, which can be suitably used in various applications such as daily sundries, household electric appliance parts, packaging materials for household electric appliance parts, automobile parts, and resins for three-dimensional modeling.

EXAMPLES

The present invention will be described more specifically by means of the Examples. Here, the Examples are mere exemplifications of the present invention, without intending to limit the scope of the present invention thereto. Parts in Examples are parts by mass unless specified otherwise.

Here, the term "ambient pressure" is 101.3 kPa, and the term "ambient temperature (room temperature)" is 25° C.

Production Example 1 of Compound Having Substituent—Production of Polyoxyalkylene Alkyl Etherification Agent A 1,000-L reactor was charged with 250 kg of a polyoxyethylene(13)-n-alkyl(C12) ether, EMULGEN 120 manufactured by Kao Corporation, alkyl chain length; n-C12, molar average degree of polymerization of oxyethylene groups: 13, in a molten state, and further 3.8 kg of tetrabutylammonium bromide manufactured by KOEI CHEMICAL COMPANY LIMITED and 81 kg of epichlorohydrin manufactured by Dow Chemical Company, and 83 kg of toluene were supplied into the reactor, and the contents were mixed while stirring. While maintaining the internal reactor temperature at 50° C., 130 kg of a 48% by mass aqueous sodium hydroxide solution manufactured by Nankai Chemical Co., Ltd. was added dropwise for 1 hour with stirring. After the termination of the dropwise addition, the mixture was aged for 6 hours with stirring, while maintaining the internal reactor temperature at 50° C. After the termination of aging, the reaction mixture was washed with 250 kg of water 6 times to remove salts and alkali, and an organic layer was heated to 90° C. under a reduced pressure of 6.6 kPa, to distill off the residual epichlorohydrin, solvents, and water. The mixture was further purged with 250 kg of steam under a reduced pressure, to remove low-boiling point compounds, to provide 240 kg of an n-alkyl(C12) polyoxyethylene(13) glycidyl ether having a structure of the following formula (4):

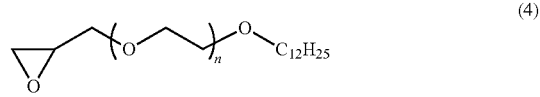

(4)

Production Example 2 of Compound Having Substituent—Production of Stearyl Glycidyl Ether Ten kilograms of stearyl alcohol, KALCOL 8098 manufactured by Kao Corporation, 0.36 kg of tetrabutylammonium bromide manufactured by KOEI CHEMICAL COMPANY LIMITED, 7.5 kg of epichlorohydrin manufactured by Dow Chemical Company, and 10 kg of hexane were supplied into a 100-L reactor, and the contents were mixed under a nitrogen atmosphere. While holding a liquid mixture at 50° C., 12 kg of a 48% by mass aqueous sodium hydroxide solution manufactured by Nankai Chemical Co., Ltd. was added dropwise thereto over 30 minutes. After the termination of the dropwise addition, the mixture was aged at 50° C. for additional 4 hours, and thereafter washed with 13 kg of water repeatedly 8 times, to remove salts and alkali. Thereafter, the internal reactor temperature was raised to 90° C., hexane was distilled off from an upper layer, and the mixture was further purged with steam under a reduced pressure of 6.6 kPa to remove low-boiling point compounds. After dehydration, the mixture was subjected to a reduced-pressure distillation at an internal reactor temperature of 250° C. and an internal reactor pressure of 1.3 kPa, to provide 8.6 kg of white stearyl glycidyl ether.

Production Example 1 of Cellulose-Based Raw Material—Production of Alkali-Treated Bagasse As an entire treatment liquid 937 parts by mass of water, granular sodium hydroxide and ion-exchanged water in amounts so that sodium hydroxide would be 15.2 parts by mass were added, based on 100 parts by mass of bagasse, the residual sugar cane on a dry basis, and the contents were heat-treated at a temperature of 120° C. for 2 hours in an autoclave manufactured by TOMY SEIKO CO., LTD., LSX-700. After the treatment, the mixture was filtered and washed with ion-exchanged water, and vacuum-dried for one day and night at 70° C., to provide alkali-treated bagasse in a fibrous form, having an average fiber size of 24 μm, a cellulose content of 70% by mass, and a water content of 3% by mass.

Production Example 2 of Cellulose-Based Raw Material—Production of Powdery Cellulose A One-hundred grams of needle-leaf bleached kraft pulp, hereinafter abbreviated as NBKP, manufactured by Fletcher Challenge Canada Ltd., "Machenzie," CSF 650 ml, in a fibrous form, having an average fiber size of 24 μm, a cellulose content of 90% by mass, and a water content of 5% by mass, were weighed out on dry basis, supplied into a batch-type vibrating mill manufactured by CHUO KAKOHKI CO., LTD "MB-1," vessel entire volume: 3.5 L, 13 rods made of SUS304 being used, each rod having a diameter φ of 30 mm, a length of 218 mm, and cross-sectional shape of circular, rod filling ratio of 57%, and subjected to a pulverization treatment for 20 minutes, to provide a powdery cellulose A having an average fiber size of 25 μm, a crystallinity of 35%, and a water content of 3% by mass.

Example 4 <Preparation of Composite of Acrylic Resin>

A needle-leaf bleached kraft pulp (NBKP) was used as the cellulose-based raw material. To 1.5 g of absolutely dried NBKP were added 6.0 g of dimethylformamide (DMF) manufactured by Wako Pure Chemical Industries, Ltd. and 1.8 g of N,N-dimethyl-4-aminopyridine (DMAP) manufactured by Wako Pure Chemical Industries, Ltd. (1.6 equivalents per AGU: calculated by assuming that the cellulose-based raw material is entirely constituted by anhydrous glucose units, hereinafter referred to the same), and the mixture was homogeneously mixed. Thereafter, 4.6 g of 1,2-epoxyhexane manufactured by Wako Pure Chemicals Industries, Ltd. (5 equivalents per AGU) was added thereto, and the contents were tightly sealed, and thereafter reacted while allowing to stand at 90° C. for 24 h. After the reaction, the reaction mixture was neutralized with acetic acid manufactured by Wako Pure Chemical Industries, Ltd., and sufficiently washed with DMF and a mixed solvent of water/isopropanol to remove impurities. Further, the mixture was vacuum-dried overnight at 50° C., to provide modified cellulose fibers.

The amount 0.25 g of the modified cellulose fibers obtained were supplied into 49.75 g of DMF, and the mixture was stirred with a homogenizer T.K. ROBOMICS manufactured by PRIMIX Corporation at 3,000 rpm, a peripheral speed: of 4.7 m/s, for 30 minutes, and thereafter subjected to 10-pass treatment with a high-pressure homogenizer "NanoVater L-ES" manufactured by YOSHIDA KIKAI CO., LTD. at 100 MPa, to provide a fine modified cellulose dispersion in which finely fibrillated modified cellulose fibers were dispersed in DMF, a solid content concentration of which was 0.5% by mass.

Forty grams of the fine modified cellulose dispersion obtained above and 2.0 g of an urethane acrylate resin UV-3310B manufactured by The Nippon Synthetic Chemical Industry Co., Ltd. were mixed, and the mixture was subjected to a finely fibrillating treatment with a high-pressure homogenizer by carrying out a 1-pass treatment at 60 MPa, and a 1-pass treatment at 100 MPa. As a photo-polymerization initiator, 0.08 g of 1-hydroxy-cyclohexyl-phenyl-ketone manufactured by Wako Pure Chemical Industries, Ltd. was added thereto, and the contents were agitated for 7 minutes with a planetary centrifugal agitator Awatori Rentaro manufactured by THINKY CORPORATION. The varnish obtained was applied in a coating thickness of 2 mm with a bar coater. The coating was dried at 80° C. for 120 minutes, to remove the solvent, and irradiated with a UV irradiation apparatus Light Hammer 10, manufactured by Fusion Systems Japan, at 200 mJ/cm$^2$ to photo-cure, to produce a sheet-like composite material molded article having a thickness of about 0.1 mm, containing 10% by mass of fine modified cellulose fibers, based on the acrylic resin.

Example 5 <Preparation of Composite of Acrylic Resin>

To 1.5 g of absolutely dried NBKP were added 6.0 g of DMF and 1.8 g of DMAP (1.6 equivalents per AGU), and the mixture was homogeneously mixed. Thereafter, 7.2 g of 1,2-epoxydecane manufactured by Wako Pure Chemicals Industries, Ltd. (5 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

The amount 0.25 g of the modified cellulose fibers obtained were supplied into 49.75 g of methyl ethyl ketone (MEK) manufactured by Wako Pure Chemical Industries, Ltd., and the mixture was stirred with the homogenizer at 3,000 rpm for 30 minutes, and thereafter subjected to 10-pass treatment with the high-pressure homogenizer at 100 MPa, to provide a fine modified cellulose dispersion in which finely fibrillated modified cellulose fibers were dispersed in MEK, a solid content concentration of which was 0.5% by mass.

Forty grams of the fine modified cellulose dispersion obtained above was used, and subjected to the same dispersion treatment as in Example 4, to produce a sheet-like composite material molded article having a thickness of about 0.1 mm, containing 10% by mass of fine modified cellulose fibers, based on the acrylic resin.

Example 31 <Preparation of Composite of Acrylic Resin>

To 1.5 g of absolutely dried NBKP were added 6.0 g of DMF and 1.8 g of DMAP (1.6 equivalents per AGU), and the mixture was homogeneously mixed. Thereafter, 24.8 g of 1,2-epoxyoctadecane manufactured by Wako Pure Chemicals Industries, Ltd. (10 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

The amount 0.25 g of the modified cellulose fibers obtained were supplied into 49.75 g of MEK, and the mixture was stirred with the homogenizer at 3,000 rpm for 30 minutes, and thereafter subjected to 10-pass treatment with the high-pressure homogenizer at 100 MPa, to provide a fine modified cellulose dispersion in which finely fibrillated modified cellulose fibers were dispersed in MEK, a solid content concentration of which was 0.5% by mass.

Forty grams of the fine modified cellulose dispersion obtained above was used, and subjected to the same dispersion treatment as in Example 4, to produce a sheet-like composite material molded article having a thickness of about 0.1 mm, containing 10% by mass of fine modified cellulose fibers, based on the acrylic resin.

Example 32 <Preparation of Composite of Acrylic Resin>

The same procedures as in Example 4 were employed except that the reaction reagent was changed to butyl glycidyl ether manufactured by Tokyo Chemical Industry Co., Ltd., and that the amount of the reagent was changed to 6.0 g (5 equivalents per AGU), to provide modified cellulose fibers.

Using modified cellulose fibers obtained, a fine modified cellulose dispersion was prepared in the same manner as in Example 4, and the dispersion was used to produce a sheet-like composite material molded article having a thickness of about 0.1 mm, containing 10% by mass of fine modified cellulose fibers, based on the acrylic resin.

Example 33 <Preparation of Composite of Acrylic Resin>

The same procedures as in Example 4 were employed except that the reaction reagent was changed to 2-ethylhexyl glycidyl ether manufactured by Tokyo Chemical Industry Co., Ltd., and that the amount of the reagent was changed to 8.6 g (5 equivalents per AGU), to provide modified cellulose fibers.

Using modified cellulose fibers obtained, a fine modified cellulose dispersion was prepared in the same manner as in Example 4, and the dispersion was used to produce a sheet-like composite material molded article having a thickness of about 0.1 mm, containing 10% by mass of fine modified cellulose fibers, based on the acrylic resin.

Example 34 <Preparation of Composite of Acrylic Resin>

To 1.5 g of absolutely dried NBKP were added 6.0 g of acetonitrile manufactured by Wako Pure Chemical Industries, Ltd. and 2.7 g of tetrabutylammonium hydroxide manufactured by Wako Pure Chemical Industries, Ltd., a 10% aqueous solution (TBAH, 0.8 equivalents per AGU), and the mixture was homogeneously mixed. Thereafter, 31.0 g of stearyl glycidyl ether prepared in Production Example 2 of Compound Having Substituent (6 equivalents per AGU) was added thereto, and the contents were tightly sealed, and thereafter reacted while allowing to stand at 70° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

The amount 0.25 g of the modified cellulose fibers obtained were supplied into 49.75 g of toluene, and the mixture was stirred with the homogenizer at 3,000 rpm for 30 minutes, and thereafter subjected to 10-pass treatment with the high-pressure homogenizer at 100 MPa, to provide a fine modified cellulose dispersion in which finely fibrillated modified cellulose fibers were dispersed in toluene, a solid content concentration of which was 0.5% by mass.

Using a modified cellulose dispersion obtained, the same procedures as in Example 4 were carried out, to produce a sheet-like composite material molded article having a thickness of about 0.1 mm, containing 10% by mass of fine modified cellulose fibers, based on the acrylic resin.

Example 6 <Preparation of Composite of Acrylic Resin>

The same procedures as in Example 5 were employed except that the cellulose-based raw material was changed to 1.5 g of microfibrillated cellulose, as a solid content, which was previously subjected to solvent replacement with DMF, manufactured by Daicel FineChem Ltd., under the trade name of "CELISH FD100-G," having a solid content concentration of 10% by mass, an average fiber size of 100 nm or less, and no solvents were additionally added, to provide modified cellulose fibers.

The amount 0.25 g of the modified cellulose fibers obtained were supplied into 49.75 g of DMF, and stirred with a magnetic stirrer at room temperature at 1,500 rpm for one hour, to provide a fine modified cellulose dispersion in which finely fibrillated modified cellulose fibers were dispersed in DMF, a solid content concentration of which was 0.5% by mass.

Forty grams of the fine modified cellulose dispersion obtained above was used, and subjected to the same dispersion treatment as in Example 4 except that the finely fibrillating treatment with the high-pressure homogenizer was not carried out, to produce a sheet-like composite material molded article having a thickness of about 0.1 mm, containing 10% by mass of fine modified cellulose fibers, based on the acrylic resin.

Example 7 <Preparation of Composite of Acrylic Resin>

To 1.5 g of absolutely dried NBKP were added 6.0 g of acetonitrile and 2.7 g of tetrabutylammonium hydroxide manufactured by Wako Pure Chemical Industries, Ltd., a 10% aqueous solution, (TBAH, 0.8 equivalents per AGU), and the mixture was homogeneously mixed. Thereafter, 22.6 g of the polyoxyalkylene alkyl etherification agent prepared in Production Example 2 of Compound Having Substituent (3 equivalents per AGU) was added thereto, and the contents were tightly sealed, and thereafter reacted while allowing to stand at 70° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

The amount 0.25 g of the modified cellulose fibers obtained were supplied into 49.75 g of MEK, and the mixture was stirred with the homogenizer at 3,000 rpm for 30 minutes, and thereafter subjected to 10-pass treatment with the high-pressure homogenizer at 100 MPa, to provide a fine modified cellulose dispersion in which finely fibrillated modified cellulose fibers were dispersed in MEK, a solid content concentration of which was 0.5% by mass.

Forty grams of the fine modified cellulose dispersion obtained above was used, and subjected to the same dispersion treatment as in Example 1, to produce a sheet-like composite material molded article having a thickness of about 0.1 mm, containing 10% by mass of fine modified cellulose fibers, based on the acrylic resin.

Example 35 <Using LBKP as Raw Material>

Broad-leaf bleached kraft pulp (hereinafter abbreviated as LBKP) derived from eucalyptus, manufactured by CENIBRA, in a fibrous form, having an average fiber size of 24 µm, a cellulose content of 90% by mass, and a water content of 5% by mass was used as a raw material cellulose. One hundred grams of the absolutely dried LBKP was supplied to a kneader manufactured by IRIE SHOKAI Co., Ltd., model PNV-1, capacity: 1.0 L equipped with a reflux tube and a dropping funnel, and 100 g of a 6.4% by mass aqueous sodium hydroxide solution (0.26 equivalent per AGU) and 100 g of isopropanol were sequentially added, and thereafter the mixture was stirred at room temperature at 50 rpm for 30 minutes to homogeneously mix. Further, 92.7 g of 1,2-epoxyhexane (1.5 equivalents per AGU) was added dropwise in 1 minute, and the reaction was carried out at 70° C. for 24 h under reflux conditions while stirring. After the reaction, the reaction mixture was neutralized with acetic acid, and the mixture was sufficiently washed with a mixed solvent of water and isopropanol to remove impurities, and further vacuum-dried overnight at 50° C., to provide modified cellulose fibers.

Using modified cellulose fibers obtained, the same procedures as in Example 4 were carried out, and the dispersion was used to produce a sheet-like composite material molded article having a thickness of about 0.1 mm, containing 10% by mass of fine modified cellulose fibers, based on the acrylic resin.

Example 36 <Using HYP as Raw Material>

The same procedures as in Example 35 were employed except that the raw material used was changed to High Yield Pulp (hereinafter abbreviated as HYP) derived from spruce, manufactured by Rottneros, in a fibrous form, having an average fiber size of 28 µm, a cellulose content of 55% by mass, and a water content of 15% by mass, to provide modified cellulose fibers.

Using modified cellulose fibers obtained, a fine modified cellulose dispersion was prepared in the same manner as in Example 4, and the dispersion was used to produce a sheet-like composite material molded article having a thickness of about 0.1 mm, containing 10% by mass of fine modified cellulose fibers, based on the acrylic resin.

Example 37 <Using ARBOCELL as Raw Material>

The same procedures as in Example 35 were employed except that the raw material used was changed to ARBOCELL BC200 (hereinafter abbreviated as ARBOCELL), manufactured by Rettenmaier Co., Ltd., in a powdery form, having an average fiber size of 65 µm, a cellulose content of 90% by mass, and a water content of 5% by mass, to provide modified cellulose fibers.

Using modified cellulose fibers obtained, a fine modified cellulose dispersion was prepared in the same manner as in Example 4, and the dispersion was used to produce a sheet-like composite material molded article having a thickness of about 0.1 mm, containing 10% by mass of fine modified cellulose fibers, based on the acrylic resin.

Example 38 <Using Powdery Cellulose A as Raw Material>

The same procedures as in Example 35 were employed except that the raw material used was changed to a powdery cellulose A obtained in Production Example 2 of Cellulose-Based Raw Material, in a powdery form, having an average fiber size of 25 µm, a cellulose content of 90% by mass, and a water content of 3% by mass, to provide modified cellulose fibers.

Using modified cellulose fibers obtained, a fine modified cellulose dispersion was prepared in the same manner as in Example 4, and the dispersion was used to produce a sheet-like composite material molded article having a thickness of about 0.1 mm, containing 10% by mass of fine modified cellulose fibers, based on the acrylic resin.

Comparative Example 1 <Acrylic Resin Blank>

The same treatments as in Example 1 were carried out except that 10 mL of MEK was used in place of the fine modified cellulose fiber dispersion, and that a coating thickness was changed to 0.5 mm, to produce a sheet-like acrylic resin molded article having a thickness of about 0.1 mm.

Comparative Example 31 <Using Microfibrillated Cellulose (MFC) as Raw Material>

To 1.5 g of microfibrillated cellulose, as a solid content, which was previously subjected to solvent replacement with DMF, manufactured by Daicel FineChem Ltd., under the trade name of "CELISH FD100-G," as a cellulose-based raw material were added 1.5 g of a 6.4% by mass aqueous sodium hydroxide solution (0.26 equivalents per AGU) and 1.5 g of isopropanol, and the mixture was homogeneously mixed. Thereafter, 0.16 g of propylene oxide manufactured by Wako Pure Chemical Industries, Ltd. (0.3 equivalents per AGU) was added thereto, and the contents were tightly sealed, and thereafter reacted while allowing to stand at 70° C. for 24 h. After the reaction, the reaction mixture was neutralized with acetic acid manufactured by Wako Pure Chemical Industries, Ltd., and sufficiently washed with a mixed solvent of water/isopropanol to remove impurities. Further, the mixture was vacuum-dried overnight at 50° C., to provide modified cellulose fibers.

Using modified cellulose fibers obtained, a fine modified cellulose dispersion was prepared in the same manner as in Example 4, and the dispersion was used to produce a sheet-like composite material molded article having a thickness of about 0.1 mm, containing 10% by mass of fine modified cellulose fibers, based on the acrylic resin.

Comparative Example 32 <Using Microfibrillated Cellulose (MFC) as Raw Material>

The same procedures as in Comparative Example 31 were carried out except that the reaction reagent was changed to butylene oxide manufactured by Wako Pure Chemical Industries, Ltd., and that the amount of the reagent was changed to 0.40 g (0.6 equivalents per AGU), to produce a sheet-like composite material molded article having a thickness of about 0.1 mm, containing 10% by mass of fine modified cellulose fibers, based on the acrylic resin.

Example 8 <Preparation of Composite of Epoxy Resin>

The alkali-treated bagasse prepared in Production Example 1 of Cellulose-Based Raw Material was used as cellulose fibers. One hundred grams of the absolutely dried alkali-treated bagasse was supplied to a kneader manufactured by IRIE SHOKAI Co., Ltd., model PNV-1, capacity: 1.0 L equipped with a reflux tube and a dropping funnel, and 100 g of a 6.4% by mass aqueous sodium hydroxide solution (0.26 equivalent per AGU) and 100 g of isopropanol were sequentially added, and thereafter the mixture was stirred at room temperature at 50 rpm for 30 minutes to homogeneously mix. Further, 92.7 g of 1,2-epoxyhexane (1.5 equivalents per AGU) was added dropwise in 1 minute, and the reaction was carried out at 70° C. for 24 h under reflux conditions while stirring. After the reaction, the reaction mixture was neutralized with acetic acid manufactured by Wako Pure Chemical Industries, Ltd., and the mixture was sufficiently washed with a mixed solvent of water and isopropanol to remove impurities, and further vacuum-dried overnight at 50° C., to provide modified cellulose fibers.

The amount 0.25 g of the modified cellulose fibers obtained were supplied into 49.75 g of DMF, and the mixture was stirred with the homogenizer at 3,000 rpm for 30 minutes, and thereafter subjected to 10-pass treatment with the high-pressure homogenizer at 100 MPa, to provide a fine modified cellulose dispersion in which finely fibrillated modified cellulose fibers were dispersed in DMF, a solid content concentration of which was 0.5% by mass.

Fifty grams of the fine modified cellulose dispersion obtained above and 2.5 g of an epoxy resin jER828 manufactured by Mitsubishi Chemical Co., Ltd. were mixed, and the mixture was subjected to a finely fibrillating treatment with a high-pressure homogenizer by carrying out a 1-pass treatment at 60 MPa, and 1-pass treatment at 100 MPa. To the solution obtained was added 0.4 g of a curing agent 2-ethyl-4-methylimidazole manufactured by Wako Pure Chemical Industries, Ltd., and agitated for 7 minutes with a planetary centrifugal agitator Awatori Rentaro manufactured by THINKY CORPORATION. The varnish obtained was applied in a coating thickness of 2 mm with a bar coater. The coating was dried at 100° C. for 1 hour, to remove the solvent, and then thermally cured at 150° C. for 2 hours, to produce a sheet-like composite material molded article having a thickness of about 0.2 mm, containing 10% by mass of fine modified cellulose fibers, based on the epoxy resin.

Example 39 <Preparation of Composite of Epoxy Resin>

Using a fine modified cellulose dispersion obtained in the same manner as in Example 4, the same procedures as in Example 8 were carried out, to produce a sheet-like composite material molded article having a thickness of about 0.2 mm, containing 10% by mass of fine modified cellulose fibers, based on the epoxy resin.

Comparative Example 2 <Epoxy Resin Blank>

The same treatments as in Example 8 were carried out except that 10 mL of DMF was used in place of the fine modified cellulose fiber dispersion, and that a coating thickness was changed to 0.5 mm, to produce a sheet-like epoxy resin molded article having a thickness of about 0.2 mm.

Example 9 <Preparation of Composite of Polystyrene Resin>

To 1.5 g of absolutely dried NBKP were added 6.0 g of DMF and 1.8 g of DMAP (1.6 equivalents per AGU), and the mixture was homogeneously mixed. Thereafter, 4.6 g of 1,2-epoxyhexane (5 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

The amount 0.50 g of the modified cellulose fibers obtained were supplied into 49.50 g of DMF, and the mixture was stirred with the homogenizer at 3,000 rpm for 30 minutes, and thereafter subjected to 10-pass treatment with the high-pressure homogenizer at 100 MPa, to provide a fine modified cellulose dispersion in which finely fibrillated modified cellulose fibers were dispersed in DMF, a solid content concentration of which was 1.0% by mass.

Fifteen grams of the fine modified cellulose dispersion obtained above, 1.5 g of a polystyrene resin manufactured by Sigma-Aldrich, number-average molecular weight: 170,000, Product Number: 441147-1KG, and 30 g of DMF were mixed, and stirred with a magnetic stirrer at room temperature and 1,500 rpm for 12 hours. Thereafter, the mixture was subjected to a finely fibrillating treatment with a high-pressure homogenizer by carrying out a 1-pass treatment at 60 MPa and a 1-pass treatment at 100 MPa. Thereafter, the mixture was agitated for 7 minutes with a planetary centrifugal agitator Awatori Rentaro manufactured by THINKY CORPORATION. The varnish obtained was supplied to a glass petri dish having a diameter of 9 cm, and dried at 100° C. for 12 hours to remove the solvent, to produce a sheet-like composite material molded article having a thickness of about 0.2 mm, containing 10% by mass of fine modified cellulose fibers, based on the polystyrene resin.

Comparative Example 3 <Polystyrene Resin Blank>

The same treatments as in Example 9 were carried out except that 15 g of DMF was used in place of the fine modified cellulose fiber dispersion, to produce a sheet-like polystyrene resin molded article having a thickness of about 0.2 mm.

Example 10 <Preparation of Composite of Polyethylene Resin>

To 80 g of a polyethylene manufactured by Japan Polyethylene Corporation, under the trade name of Novatec LL UF641, 8.0 g of the modified cellulose fibers obtained in the same manner as in Example 8 were directly added without going through the finely fibrillating step, and the mixture was kneaded with a kneader Labo-plasto mill, manufactured by TOYO SEIKI SEISAKU-SHO, at a rotational speed of 50 rpm, at 240° C. for 8 minutes, to provide a homogeneous mixture. The homogeneous mixture was sequentially pressed with a pressing machine "Labo-press" manufactured by TOYO SEIKI SEISAKU-SHO under conditions of 240° C., 0.4 MPa for 1 minute, 20 MPa for 1 minutes, and then at 80° C., 0.4 MPa for 1 minute, to produce a sheet-like composite material molded article having a thickness of about 0.4 mm, containing 10% by mass of modified cellulose fibers, based on the polyethylene resin.

Example 11 <Preparation of Composite of Polyethylene Resin>

The same treatments as in Example 10 were carried out, except that 2 g of a maleic anhydride-modified polypropylene manufactured by Sanyo Chemical Industries, Ltd. under the trade name of Umex 1001 was further added as a compatibilizing agent, to produce a sheet-like composite material molded article having a thickness of about 0.4 mm, containing 10% by mass of modified cellulose fibers, based on the polyethylene resin, and 2.5% by mass of a compatibilizing agent, based on the polyethylene resin.

Example 40 <Preparation of Composite of Polyethylene Resin>

To 1.5 g of absolutely dried NBKP were added 6.0 g of DMF and 1.8 g of N,N-dimethyl-4-aminopyridine (DMAP) manufactured by Wako Pure Chemical Industries, Ltd. (1.6 equivalents per AGU), and the mixture was homogeneously mixed. Thereafter, 4.6 g of 1,2-epoxyhexane (5 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

The same treatments as in Example 10 were carried out except that the modified cellulose fibers used were changed to the modified cellulose fibers obtained above, to produce a sheet-like composite material molded article having a thickness of about 0.4 mm, containing 10% by mass of modified cellulose fibers, based on the polyethylene resin.

Example 41 <Preparation of Composite of Polyethylene Resin>

The same treatments as in Example 10 were carried out except that 8.0 g of the powdery modified cellulose fibers obtained by previously supplying 100 g of the modified cellulose fibers obtained in Example 40 (dry basis) into a batch-type vibrating mill "MB-1" manufactured by CHUO KAKOHKI CO., LTD, having a reactor entire volume of 3.5 L, using 13 rods made of SUS304 having a diameter φ of 30 mm, a length of 218 mm, a cross-sectional shape of circular, and a rod filling ratio of 57%, and subjecting the contents to a pulverization treatment for 20 minutes were used, to produce a sheet-like composite material molded article having a thickness of about 0.4 mm, containing 10% by mass of modified cellulose fibers, based on the polyethylene resin.

Example 42 <Preparation of Composite of Polyethylene Resin>

The same treatments as in Example 10 were carried out except that the modified cellulose fibers used were changed to the modified cellulose fibers obtained in the same manner as in Example 31, to produce a sheet-like composite material molded article having a thickness of about 0.4 mm, containing 10% by mass of modified cellulose fibers, based on the polyethylene resin.

Example 43 <Preparation of Composite of Polyethylene Resin>

The same treatments as in Example 10 were carried out except that the modified cellulose fibers used were changed to the modified cellulose fibers obtained in the same manner as in Example 34, to produce a sheet-like composite material molded article having a thickness of about 0.4 mm, containing 10% by mass of modified cellulose fibers, based on the polyethylene resin.

Comparative Example 4 <Polyethylene Blank>

The same treatments as in Example 10 were carried out except that the modified cellulose fibers were not used, to produce a sheet-like polyethylene resin molded article having a thickness of about 0.4 mm.

Comparative Example 5 <Addition of Compatibilizing Agent>

The same treatments as in Comparative Example 4 were carried out except that 2 g of Umex 1001 was further added as the compatibilizing agent, to produce a sheet-like composite material molded article having a thickness of about 0.4 mm, containing 2.5% by mass of the compatibilizing agent, based on the polyethylene resin.

Comparative Example 33 <Preparation of Composite of Polyethylene Resin>

To 1.5 g of absolutely dried NBKP were added 1.5 g of a 6.4% by mass aqueous sodium hydroxide solution (0.26 equivalents per AGU) and 1.5 g of isopropanol, and the mixture was homogeneously mixed. Thereafter, 0.16 g of propylene oxide (0.3 equivalents per AGU) was added thereto, and the contents were tightly sealed, and thereafter reacted while allowing to stand at 70° C. for 24 h. After the reaction, the reaction mixture was neutralized with acetic acid, and sufficiently washed with a mixed solvent of water/isopropanol to remove impurities. Further, the mixture was vacuum-dried overnight at 50° C., to provide modified cellulose fibers.

The same treatments as in Example 10 were carried out using the modified cellulose fibers obtained, to produce a sheet-like composite material molded article having a thickness of about 0.4 mm, containing 10% by mass of modified cellulose fibers, based on the polyethylene resin.

The modified cellulose fibers obtained were evaluated for substituent introduction ratio, average fiber the sizes of modified cellulose fibers and the cellulose-based raw material, and confirmation of the crystal structure (crystallinity) in accordance with the methods of the following Test Examples 1 to 4. In addition, the properties of the molded article were each evaluated in accordance with the following Test Examples 5 to 7. The results are shown in Tables 1 to 5.

Test Example 1—Substituent Introduction Ratio, Degree of Substitution

The % content (% by mass) of the hydrophobic ether group contained in the modified cellulose fibers obtained was calculated in accordance with Zeisel method, which has been known as a method of analyzing an average number of moles added of alkoxy groups of the cellulose ethers described in *Analytical Chemistry*, 51(13), 2172 (1979), "Fifteenth Revised Japan Pharmacopeia (Section of Method of Analyzing Hydroxypropyl Cellulose)" or the like. The procedures are shown hereinbelow.

(i) To a 200 mL volumetric flask was added 0.1 g of n-octadecane, and filled up to a marked line with hexane, to provide an internal standard solution.

(ii) One-hundred milligrams of modified cellulose fibers previously purified and dried, and 100 mg of adipic acid were accurately weighed in a 10 mL vial jar, 2 mL of hydrogen iodide was added thereto, and the vial jar was tightly sealed.

(iii) The mixture in the above vial jar was heated with a block heater at 160° C. for 1 hour, while stirring with stirrer chips.

(iv) After heating, 3 mL of the internal standard solution and 3 mL of diethyl ether were sequentially injected to the vial, and a liquid mixture was stirred at room temperature for 1 minute.

(v) An upper layer (diethyl ether layer) of the mixture separated in two layers in the vial jar was analyzed by gas chromatography with "GC2010Plus," manufactured by SHIMADZU Corporation. The analytical conditions were as follows:

Column: DB-5, manufactured by Agilent Technologies (12 m, 0.2 mm×0.33 μm)

Column Temperature: 100° C., heating at 10° C./min, to 280° C. (holding for 10 min)

Injector Temperature: 300° C., detector temperature: 300° C., input amount: 1 μL The content of the ether groups in the modified cellulose fibers (% by mass) was calculated from a detected amount of the etherification reagent used.

From the ether group content obtained, the molar substitution (MS), amount of moles of substituents based on one mol of the anhydrous glucose unit, was calculated using the following formula (1):

$$MS=(W1/Mw)/((100-W1)/162.14) \quad \text{(Formula 1)}$$

W1: The content of the ether groups in the modified cellulose fibers, % by mass

Mw: The molecular weight of the introduced etherification reagent, g/mol

Test Example 2—Average Fiber Sizes of Cellulose-Based Raw Material and Modified Cellulose Fibers The fiber sizes of the cellulose-based raw material and the modified cellulose fibers were obtained by the following method. About 0.3 g of an absolutely dried sample was accurately weighed, and stirred in 1.0 L of ion-exchanged water with a household mixer for one minute, to defibriate the fibers in water. Thereafter, 4.0 L of ion-exchanged water was further added, and the mixture was stirred to make it homogeneous. From the aqueous dispersion obtained, about 50 g was collected and accurately weighed as the measurement liquid. The measurement liquid obtained was analyzed by "Kajaani Fiber Lab" manufactured by Metso Automation, to provide an average fiber size.

Test Example 3—Average Fiber Size of Fine Modified Cellulose Fibers

The dispersion obtained was observed with an optical microscope "Digital Microscope VHX-1000" manufactured by KEYENCE at a magnification of from 300 to 1,000, and calculating an average of 30 or more of fiber strands (calculated by rounding off to a first decimal as a significant digit). In a case where observation with an optical microscope was difficult, a solvent was further added to the cellulose fiber dispersion, to provide a 0.0001% by mass dispersion, and the dispersion was dropped on mica and dried, to provide an observation sample, and a fiber height of the cellulose fibers in the observation sample was measured with an interatomic force microscope (AFM), Nanoscope III Tapping mode AFM, manufactured by Digital Instrument, the probe Point Probe (NCH) manufactured by NANOSENSORS being used. During the measurements, five or more sets of fine cellulose fibers were extracted from a microscopic image in which the cellulose fibers could be confirmed, and an average fiber size, a fiber size in the dispersion, was calculated from those fiber heights. Here, a case where fibers were aggregated in a dispersion to make analysis impossible is listed as ">10,000."

Test Example 4—Confirmation of Crystal Structure

The crystal structure of the modified cellulose fibers was confirmed by measuring with "Rigaku RINT 2500VC X-RAY diffractometer" manufactured by Rigaku Corporation. The measurement conditions were as follows: X-ray source: Cu/Kα-radiation, tube voltage: 40 kV, tube current: 120 mA, measurement range: diffraction angle 2θ=5° to 45°, scanning speed of X-ray: 10°/min. A sample for the measurement was prepared by compressing pellets to a size having an area of 320 mm$^2$ and a thickness of 1 mm. Also, as to the crystallinity of the cellulose I crystal structure, X-ray diffraction intensity was calculated by the following formula (A):

$$\text{Cellulose } I \text{ Crystallinity (\%)}=[(I22.6-I18.5)/I22.6]\times 100 \quad \text{(A)}$$

wherein I22.6 is a diffraction intensity of a lattice face (face 002)(angle of diffraction 2θ=22.6°), and I18.5 is a diffraction intensity of an amorphous portion (angle of diffraction 2θ=18.5°), in X-ray diffraction.

On the other hand, in a case where a crystallinity obtained by the above formula (A) is 35% or less, it is preferable to use a calculated value based on the formula (B) given below as a crystallinity, in accordance with the description of P199-200 of "*Mokushitsu Kagaku Jikken Manyuaru* (*Wood Science Experimental Manual*)," edited by The Japan Wood Research Society, from the viewpoint of improving the calculation accuracy.

Therefore, in a case where a crystallinity obtained by the above formula (A) is 35% or less, a calculated value based on the following formula (B) can be used as a crystallinity:

$$\text{Cellulose } I \text{ Crystallinity (\%)}=[Ac/(Ac+Aa)]\times 100 \quad \text{(B)}$$

wherein Ac is a total sum of peak areas of a lattice face (002 face)(angle of diffraction 2θ=22.6°), a lattice face (011 face)(angle of diffraction 2θ=15.1°), and a lattice face (0-11 face)(angle of diffraction 2θ=16.2°), Aa is a peak area of an amorphous portion (angle of diffraction 2θ=18.5°), each peak area being calculated by fitting the X-ray diffraction chart obtained to a Gaussian function, in X-ray diffraction.

Test Example 5—Storage Modulus

Using a dynamic viscoelastometer "DMS6100," manufactured by SII, the storage modulus of a rectangular sample cut out to have a width of 5 mm and a length of 20 mm from the molded article obtained was measured in tensile mode while raising the temperature from −50° C. to 200° C. in a rate of 2° C. per minute in a nitrogen atmosphere at a frequency of 1 Hz. The storage modulus each listed in the table is a value at a temperature shown in parenthesis, and the higher the storage moduli (MPa), the more excellent the strength, so that it is shown that the higher the strength at high temperatures, the more excellent the heat resistance.

Test Example 6—Coefficient of Linear Thermal Expansion (CTE)

Using a thermal stress-strain measurement apparatus "EXSTAR TMA/SS6100" manufactured by Seiko Instruments, Inc., the measurements were taken with a rectangular sample having a width of 3 mm and a length of 20 mm, which was subjected to temperature elevation at a rate of 5° C. per minute under a nitrogen atmosphere in a tensile mode, with applying a load of 25 g. The coefficient of linear thermal expansion (CTE) is obtained by calculating an average coefficient of linear thermal expansion within a given temperature range. The number within the parenthesis listed in the tables shows a temperature range used in the calculation, and it is shown that the lower the CTE, the more excellent the dimensional stability.

Test Example 7—Tensile Modulus

In a thermostatic chamber at 25° C., a tensile modulus of a molded article was measured with a tensile compression tester "Autograph AGS-X" manufactured by SHIMADZU Corporation, as prescribed in JIS K7113. Samples punched through with No. 2 dumbbell were set apart with a span of 80 mm at a crosshead speed of 10 mm/min. It is shown that the higher the tensile moduli, the more excellent the mechanical strength.

TABLE 1

| | | | Comparative Examples | | Examples | | |
|---|---|---|---|---|---|---|---|
| | | | 31 | 32 | 4 | 5 | 31 |
| Modified Cellulose Fibers | | Average Fiber Size Before Fine Fibrillation, μm | ≤0.1 | ≤0.1 | 25 | 24 | 23 |
| | | Average Fiber Size After Fine Fibrillation, nm | 290 | 282 | 23 | 61 | 78 |
| | Substituent | Formula $R_1$ (1) | $-CH_3$ | $-C_2H_5$ | $-C_4H_9$ | $-C_8H_{17}$ | $-C_{16}H_{33}$ |
| | | Degree of Substitution | 0.15 | 0.16 | 0.46 | 0.40 | 0.24 |
| | | Formula $R_1$ (2) | — | — | — | — | — |
| | | n | | | | | |
| | | A | — | — | — | — | — |
| | | Degree of Substitution | — | — | — | — | — |
| | | Cellulose Crystal Form Before Fine Fibrillation | I | I | I | I | I |
| | | Crystallinity Before Fine Fibrillation, % | 48 | 46 | 48 | 51 | 56 |
| | | Raw Material Cellulose | MFC | MFC | NBKP | NBKP | NBKP |
| | | Content Based on 100 Parts by Mass of Resin | 10 | 10 | 10 | 10 | 10 |
| Molded Article | | Resin | Acrylic | Acrylic | Acrylic | Acrylic | Acrylic |
| | | Mixing Method | Solution-mixing | Solution-mixing | Solution-mixing | Solution-mixing | Solution-mixing |
| | | Molding Method | Casting | Casting | Casting | Casting | Casting |
| | | Storage Modulus, MPa | 18 (150° C.) | 20 (150° C.) | 30 (150° C.) | 95 (150° C.) | 181 (150° C.) |
| | | CTE, ppm/K | 195 (50-100° C.) | 160 (50-100° C.) | 79 (50-100° C.) | 118 (50-100° C.) | 73 (50-100° C.) |

TABLE 2

| | | | Examples | | | | Comparative Example |
|---|---|---|---|---|---|---|---|
| | | | 32 | 33 | 34 | 7 | 1 |
| Modified Cellulose Fibers | | Average Fiber Size Before Fine Fibrillation, μm | 24 | 24 | 24 | 24 | — |
| | | Average Fiber Size After Fine Fibrillation, nm | 25 | 48 | 81 | 52 | — |
| | Substituent | Formula $R_1$ (1) | — | — | — | — | — |
| | | Degree of Substitution | — | — | — | — | — |
| | | Formula $R_1$ (2) | $-C_4H_9$ | $-C_8H_{17}$ | $-C_{18}H_{37}$ | $-C_{12}H_{25}$ | — |
| | | n | 0 | 0 | 0 | 13 | — |
| | | A | — | — | — | $-CH_2CH_2O-$ | — |
| | | Degree of Substitution | 0.57 | 0.10 | 0.30 | 0.01 | — |
| | | Cellulose Crystal Form Before Fine Fibrillation | I | I | I | I | — |
| | | Crystallinity Before Fine Fibrillation, % | 57 | 52 | 55 | 55 | — |
| | | Raw Material Cellulose | NBKP | NBKP | NBKP | NBKP | — |
| | | Content Based on 100 Parts by Mass of Resin | 10 | 10 | 10 | 10 | 0 |
| Molded Article | | Resin | Acrylic | Acrylic | Acrylic | Acrylic | Acrylic |
| | | Mixing Method | Solution-mixing | Solution-mixing | Solution-mixing | Solution-mixing | Solution-mixing |

TABLE 2-continued

|  | Examples | | | | Comparative Example |
|---|---|---|---|---|---|
|  | 32 | 33 | 34 | 7 | 1 |
| Molding Method | Casting | Casting | Casting | Casting | Casting |
| Storage Modulus, MPa | 21 (150° C.) | 75 (150° C.) | 210 (150° C.) | 205 (150° C.) | 14 (150° C.) |
| CTE, ppm/K | 145 (50-100° C.) | 83 (50-100° C.) | 38 (50-100° C.) | 71 (50-100° C.) | 194 (50-100° C.) |

TABLE 3

|  |  |  | Examples | | | | | |
|---|---|---|---|---|---|---|---|---|
|  |  |  | 4 | 6 | 35 | 36 | 37 | 38 |
| Modified Cellulose Fibers | Average Fiber Size Before Fine Fibrillation, μm | | 24 | ≤0.1 | 24 | 28 | 65 | 25 |
|  | Average Fiber Size After Fine Fibrillation, nm | | 23 | 281 | 24 | 22 | 11 | 23 |
|  | Substituent | Formula (1) R$_1$ | —C$_4$H$_9$ | —C$_8$H$_{17}$ | —C$_4$H$_9$ | —C$_4$H$_9$ | —C$_4$H$_9$ | —C$_4$H$_9$ |
|  |  | Degree of Substitution | 0.46 | 0.19 | 0.26 | 0.35 | 0.30 | 0.28 |
|  |  | Formula (2) R$_1$ | — | — | — | — | — | — |
|  |  | n | — | — | — | — | — | — |
|  |  | A | — | — | — | — | — | — |
|  |  | Degree of Substitution | — | — | — | — | — | — |
|  | Cellulose Crystal Form Before Fine Fibrillation | | I | I | I | I | I | I |
|  | Crystallinity Before Fine Fibrillation, % | | 48 | 48 | 60 | 49 | 56 | 35 |
|  | Raw Material Cellulose | | NBKP | MFC | LBKP | HYP | ARBOCEL | Powdery Cellulose A |
| Molded Article | Content Based on 100 Parts by Mass of Resin | | 10 | 10 | 10 | 10 | 10 | 10 |
|  | Resin | | Acrylic | Acrylic | Acrylic | Acrylic | Acrylic | Acrylic |
|  | Mixing Method | | Solution-mixing | Solution-mixing | Solution-mixing | Solution-mixing | Solution-mixing | Solution-mixing |
|  | Molding Method | | Casting | Casting | Casting | Casting | Casting | Casting |
|  | Storage Modulus, MPa | | 30 (150° C.) | 17 (150° C.) | 38 (150° C.) | 30 (150° C.) | 38 (150° C.) | 45 (150° C.) |
|  | CTE, ppm/K | | 79 (50-100° C.) | 135 (50-100° C.) | 85 (50-100° C.) | 78 (50-100° C.) | 70 (50-100° C.) | 101 (50-100° C.) |

TABLE 4

|  |  |  | Examples | | Comparative Example | Example | Comparative Example |
|---|---|---|---|---|---|---|---|
|  |  |  | 8 | 39 | 2 | 9 | 3 |
| Modified Cellulose Fibers | Average Fiber Size Before Fine Fibrillation, μm | | 23 | 24 | — | 25 | — |
|  | Average Fiber Size After Fine Fibrillation, nm | | 23 | 24 | — | 23 | — |
|  | Substituent | Formula (1) R$_1$ | —C$_4$H$_9$ | —C$_4$H$_9$ | — | —C$_4$H$_9$ | — |
|  |  | Degree of Substitution | 0.22 | 0.20 | — | 0.46 | — |
|  |  | Formula (2) R$_1$ | — | — | — | — | — |
|  |  | n | — | — | — | — | — |
|  |  | A | — | — | — | — | — |
|  |  | Degree of Substitution | — | — | — | — | — |
|  | Cellulose Crystal Form Before Fine Fibrillation | | I | I | — | I | — |
|  | Crystallinity Before Fine Fibrillation, % | | 38 | 57 | — | 48 | — |
|  | Raw Material Cellulose | | Bagasse | NBKP | — | NBKP | — |
| Molded Article | Content Based on 100 Parts by Mass of Resin | | 10 | 10 | 0 | 10 | 0 |
|  | Resin | | Epoxy | Epoxy | Epoxy | Polystyrene | Polystyrene |
|  | Mixing Method | | Solution-mixing | Solution-mixing | Solution-mixing | Solution-mixing | Solution-mixing |
|  | Molding Method | | Casting | Casting | Casting | Casting | Casting |
|  | Storage Modulus, MPa | | 300 (200° C.) | 315 (200° C.) | 118 (200° C.) | 225 (120° C.) | 0.12 (120° C.) |

TABLE 4-continued

|  | Examples | | Comparative Example | Example | Comparative Example |
|---|---|---|---|---|---|
|  | 8 | 39 | 2 | 9 | 3 |
| CTE, ppm/K | 61 (150-180° C.) | 55 (150-180° C.) | 183 (150-180° C.) | 43 (105-110° C.) | 19315 (105-110° C.) |

TABLE 5

|  |  |  |  | Comparative Example | Examples | | | |
|---|---|---|---|---|---|---|---|---|
|  |  |  |  | 33 | 10 | 11 | 40 | 41 |
| Modified Cellulose Fibers | Average Fiber Size, μm | | | 24 | 23 | 23 | 25 | 50 |
|  | Substituent | Formula (1) | $R_1$ | —$CH_3$ | —$C_4H_9$ | —$C_4H_9$ | —$C_4H_9$ | —$C_4H_9$ |
|  |  |  | Degree of Substitution | 0.15 | 0.22 | 0.22 | 0.46 | 0.46 |
|  |  | Formula (2) | $R_1$ | — | — | — | — | — |
|  |  |  | n | — | — | — | — | — |
|  |  |  | A | — | — | — | — | — |
|  |  |  | Degree of Substitution | — | — | — | — | — |
|  | Cellulose Crystal Form Before Fine Fibrillation | | | I | I | I | I | I |
|  | Crystallinity Before Fine Fibrillation, % | | | 57 | 38 | 38 | 48 | 57 |
|  | Raw Material Cellulose | | | NBKP | Bagasse | Bagasse | NBKP | NBKP |
|  | Pretreatment Before Mixing | | | None | None | None | None | Vibrating Mill |
|  | Content, Based on 100 Parts by Mass of Resin | | | 10 | 10 | 10 | 10 | 10 |
| Additive | Umex 1001 | | | — | — | 2.5 | — | — |
| Molded Article | Resin | | | Polyethylene | Polyethylene | Polyethylene | Polyethylene | Polyethylene |
|  | Mixing Method | | | Melt-Kneading | Melt-Kneading | Melt-Kneading | Melt-Kneading | Melt-Kneading |
|  | Molding Method | | | Heat press | Heat press | Heat press | Heat press | Heat press |
|  | Storage Modulus, MPa | | | 405 | 1,000 | 1,400 | 1,110 | 1,280 |

|  |  |  |  | Examples | | Comparative Examples | |
|---|---|---|---|---|---|---|---|
|  |  |  |  | 42 | 43 | 4 | 5 |
| Modified Cellulose Fibers | Average Fiber Size, μm | | | 23 | 24 | — | — |
|  | Substituent | Formula (1) | $R_1$ | —$C_{16}H_{33}$ | — | — | — |
|  |  |  | Degree of Substitution | 0.24 | — | — | — |
|  |  | Formula (2) | $R_1$ | — | —$C_{18}H_{37}$ | — | — |
|  |  |  | n | — | 0 | — | — |
|  |  |  | A | — | — | — | — |
|  |  |  | Degree of Substitution | — | 0.30 | — | — |
|  | Cellulose Crystal Form Before Fine Fibrillation | | | I | I | — | — |
|  | Crystallinity Before Fine Fibrillation, % | | | 40 | 56 | — | — |
|  | Raw Material Cellulose | | | NBKP | NBKP | — | — |
|  | Pretreatment Before Mixing | | | None | None | — | — |
|  | Content, Based on 100 Parts by Mass of Resin | | | 10 | 10 | 0 | 0 |
| Additive | Umex 1001 | | | — | — | — | 2.5 |
| Molded Article | Resin | | | Polyethylene | Polyethylene | Polyethylene | Polyethylene |
|  | Mixing Method | | | Melt-Kneading | Melt-Kneading | Melt-Kneading | Melt-Kneading |
|  | Molding Method | | | Heat press | Heat press | Heat press | Heat press |
|  | Storage Modulus, MPa | | | 1,310 | 1,350 | 394 | 385 |

It can be seen from Tables 1 to 5 that the resin compositions of the present invention contain specified modified cellulose fibers, so that the resin compositions have excellent mechanical strength, dimensional stability, and heat resistance in wide applicable ranges, regardless of the kinds of the resins or the method of forming composites.

INDUSTRIAL APPLICABILITY

The resin composition of the present invention can be suitably used in various industrial applications such as daily sundries, household electric appliance parts, wrapping materials for household electric appliance parts, automobile parts, and resins for three-dimensional modeling.

The invention claimed is:

1. A resin composition comprising:
(A) one or more resins selected from the group consisting of a thermoplastic resin selected from a polylactic acid resin, a polyethylene-based resin, a polypropylene-based resin, an ABS resin, a triacetylated cellulose resin, a diacetylated cellulose resin, a nylon resin, a vinyl chloride resin, a styrene resin, a vinyl ether resin, a polyvinyl alcohol resin, a polyamide-based resin, a polycarbonate-based resin, and a polysulfonate-based resin, and a curable resin selected from an epoxy resin, a (meth)acrylic resin, a phenolic resin, an unsaturated polyester resin, a polyurethane resin, or a polyimide resin; and
(B) modified cellulose fibers wherein one or more substituents selected from substituents represented by the following general formula (1) and substituents represented by the following general formula (2):

$$-CH_2-CH(OH)-R_1 \quad (1)$$

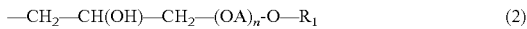

$$-CH_2-CH(OH)-CH_2-(OA)_n-O-R_1 \quad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms
are bonded to cellulose fibers via an ether bond, wherein the modified cellulose fibers have a cellulose I crystal structure and the crystallinity of the modified cellulose fibers is between 10% and 90%.

2. The resin composition according to claim 1, wherein the modified cellulose fibers are modified cellulose fibers represented by the following general formula (3):

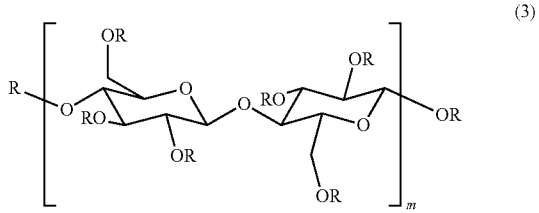

(3)

wherein R, which may be identical or different, is hydrogen, or a substituent selected from substituents represented by the general formula (1) defined above and substituents represented by the general formula (2) defined above; and m is an integer of 20 or more and 3,000 or less, with proviso that a case where all R's are simultaneously hydrogens is excluded.

3. The resin composition according to claim 1, wherein the introduction ratio of the substituent or substituents selected from substituents represented by the general formula (1) and substituents represented by the general formula (2) is 0.001 mol or more and 1.5 mol or less, per mol of the anhydrous glucose unit.

4. The resin composition according to claim 1, wherein n is a number of 0 or more and 20 or less, and A is a linear or branched, divalent saturated hydrocarbon group having 2 or more carbon atoms and 3 or less carbon atoms, in the substituent represented by the general formula (2).

5. The resin composition according to claim 1, wherein the modified cellulose fibers have an average fiber size of 5 μm or more.

6. The resin composition according to claim 1, wherein the modified cellulose fibers have an average fiber size of 1 nm or more and 500 nm or less.

7. The resin composition according to claim 1, wherein the content of the modified cellulose fibers is 0.5 parts by mass or more and 100 parts by mass or less, based on 100 parts by mass of the resin.

8. The resin composition according to claim 1, wherein $R_1$ in the general formula (1) has the number of carbon atoms of 4 or more and 20 or less.

9. The resin composition according to claim 1, wherein $R_1$ in the general formula (2) has the number of carbon atoms of 4 or more and 20 or less.

10. The resin composition resin composition according to claim 1, wherein A in the general formula (2) has the number of carbon atoms of 2 or more and 4 or less.

11. The resin composition according to claim 1, wherein the introduction ratio of the substituent or substituents selected from substituents represented by the general formula (1) and substituents represented by the general formula (2) is 0.01 mol or more, per mol of the anhydrous glucose unit of the cellulose.

12. The resin composition according to claim 1, wherein the crystallinity of the modified cellulose fibers is 20% or more.

13. The resin composition according to claim 1, wherein the crystallinity of the modified cellulose fibers is 80% or less.

14. A method for producing a resin composition comprising:
(A) one or more resins selected from the group consisting of a thermoplastic resin selected from a polylactic acid resin, a polyethylene-based resin, a polypropylene-based resin, an ABS resin, a triacetylated cellulose resin, a diacetylated cellulose resin, a nylon resin, a vinyl chloride resin, a styrene resin, a vinyl ether resin, a polyvinyl alcohol resin, a polyamide-based resin, a polycarbonate-based resin, and a polysulfonate-based resin, and a curable resin selected from an epoxy resin, a (meth)acrylic resin, a phenolic resin, an unsaturated polyester resin, a polyurethane resin, or a polyimide resin; and (B) modified cellulose fibers,
comprising
introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material, in the presence of a base via an ether bond, and
mixing the modified cellulose fibers obtained and the above resin to provide modified cellulose fibers.

15. The method for producing a resin composition according to claim 14, wherein the base is one or more members selected from alkali metal hydroxides, alkaline earth metal hydroxides, primary to tertiary amines, quaternary ammonium salts, imidazoles and derivatives thereof, pyridine and derivatives thereof, and alkoxides.

16. The method for producing a resin composition according to claim 14, wherein the amount of the base is 0.01 equivalents or more and 10 equivalents or less, based on the anhydrous glucose unit in the cellulose-based raw material.

17. The method for producing a resin composition according to claim 14, wherein the nonionic alkylene oxide compound is a compound represented by the following general formula (1A):

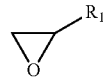

wherein $R_1$ is a linear or branched alkyl group having 4 or more carbon atoms and 30 or less carbon atoms.

18. The method for producing a resin composition according to claim 14, wherein the nonionic glycidyl ether compound is a compound represented by the following general formula (2A):

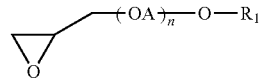

wherein $R_1$ is a linear or branched alkyl group having 4 or more carbon atoms and 30 or less carbon atoms; A is a linear or branched, divalent saturated hydrocarbon group having 1 or more carbon atoms and 6 or less carbon atoms; and n is a number of 0 or more and 50 or less.

* * * * *